United States Patent [19]
Hara et al.

[11] Patent Number: 5,815,598
[45] Date of Patent: Sep. 29, 1998

[54] APPARATUS FOR IDENTIFYING AN INDIVIDUAL BASED ON A FINGERPRINT IMAGE

[75] Inventors: Tsutomu Hara; Yuji Kobayashi; Haruyoshi Toyoda, all of Hamamatsu, Japan

[73] Assignee: Hamamatsu Photonics K.K., Shizuoka-ken, Japan

[21] Appl. No.: 974,674

[22] Filed: Nov. 19, 1997

Related U.S. Application Data

[63] Continuation of Ser. No. 412,218, Mar. 27, 1995, abandoned, which is a continuation of Ser. No. 113,254, Aug. 30, 1993, abandoned.

[30] Foreign Application Priority Data

Aug. 28, 1992 [JP] Japan .................................. 4-230054

[51] Int. Cl.$^6$ .............................. G06K 9/76; G06K 9/00; G02F 1/135; G02F 1/03
[52] U.S. Cl. ........................... 382/211; 349/25; 359/256; 359/259; 382/124; 382/278
[58] Field of Search ....................... 382/116, 124, 382/278, 280, 211; 359/254, 256, 272, 259; 349/25

[56] References Cited

U.S. PATENT DOCUMENTS

| | | | |
|---|---|---|---|
| 4,357,676 | 11/1982 | Brown | 364/822 |
| 4,414,684 | 11/1983 | Blonder | 382/32 |
| 4,832,447 | 5/1989 | Javidi | 364/822 |
| 4,865,427 | 9/1989 | Kingston et al. | 385/8 |
| 4,941,735 | 7/1990 | Moddel et al. | 359/72 |
| 4,972,498 | 11/1990 | Leib | 382/31 |
| 5,040,140 | 8/1991 | Horner | 382/42 |

(List continued on next page.)

FOREIGN PATENT DOCUMENTS

| | | |
|---|---|---|
| 0272820 | 12/1987 | European Pat. Off. . |
| 0475612 | 8/1991 | European Pat. Off. . |
| 0451681 | 10/1991 | European Pat. Off. ................. 359/63 |
| 2610735 | 2/1987 | France . |
| 4990155 | 8/1974 | Japan . |
| 870033799 | 2/1987 | Japan . |
| 63201795 | 8/1988 | Japan . |

(List continued on next page.)

OTHER PUBLICATIONS

Bahram Javidi, Qing Tang, Don A. Gregory and T.D. Hudson, Experiments on nonlinear joint transform correlator using an optically addressed spatial light modulator in the Fourier plane, 2219 Applied Optics, vol. 30, No. 14, 10 May, 1991, New York, pp. 1772–1776.

Bahram Javidi and Chung–Jung Kuo, Joint transform image correlation using a binary spatial light modulator at the Fourier plane, 15 Feb., 1988, vol. 27, No. 4, Applied Optics, pp. 663–665.

(List continued on next page.)

*Primary Examiner*—Joseph Mancuso
*Assistant Examiner*—Jayanti K. Patel
*Attorney, Agent, or Firm*—Sughrue, Mion, Zinn, Macpeak & Seas, PLLC

[57] ABSTRACT

In an individual identification apparatus, a hologram 11 recorded on a card is irradiated with laser light to read out a fingerprint image of a specific person. A finger of an arbitrary person to be identified with the specific person is irradiated with laser light to obtain a fingerprint image. Thus obtained fingerprint images are jointly written in a first SLM. Then, the joint image is read out and Fourier transformed to obtain a Joint Fourier Transform image, which is then written in a second SLM. The Joint Fourier Transform image is then read out and Fourier transformed to obtain a pair of output correlation peaks. A photodetector detects the intensity of the output correlation peaks and outputs a signal indicative of the intensity. A threshold processor compares the value of the signal with a predetermined threshold value to positively or negatively identify the arbitrary person with the specific person.

21 Claims, 13 Drawing Sheets

U.S. PATENT DOCUMENTS

| | | |
|---|---|---|
| 5,050,220 | 9/1991 | Marsh et al. .............................. 382/32 |
| 5,073,950 | 12/1991 | Colbert et al. .............................. 382/2 |
| 5,119,443 | 6/1992 | Javidi et al. .............................. 382/211 |
| 5,138,468 | 8/1992 | Barbanell .................................. 359/2 |
| 5,175,775 | 12/1992 | Iwaki et al. ............................ 382/211 |
| 5,214,534 | 5/1993 | Kallman et al. .......................... 359/61 |
| 5,216,541 | 6/1993 | Takesue et al. .......................... 382/31 |
| 5,224,173 | 6/1993 | Kuhns et al. .............................. 382/2 |
| 5,239,595 | 8/1993 | Takemura et al. ...................... 382/211 |
| 5,257,322 | 10/1993 | Matsuoka et al. . |
| 5,274,716 | 12/1993 | Mitsuoka et al. ........................ 382/31 |
| 5,323,472 | 6/1994 | Falk ...................................... 382/211 |

FOREIGN PATENT DOCUMENTS

| | | |
|---|---|---|
| 63 177 279 | 11/1988 | Japan . |
| 63 311 194 | 4/1989 | Japan . |
| 0027051 | 2/1990 | Japan . |
| 3-77176 | 4/1991 | Japan . |
| 3204625 | 9/1991 | Japan . |
| 4-178616 | 6/1992 | Japan . |
| 4-363617 | 12/1992 | Japan . |

OTHER PUBLICATIONS

M.M. Labes, "Molecular Crystals and Liquid Crystals Incorporating Nonlinear Optics," Mol. Cryst. Liq. Cryst., 1987, vol. 152, pp. 597–607.

H. Hatoh et al., "Large–area Projection HAN–mode Multicolor TFT–addressed LCD," Molecular Crystals and Liquid Crystals incorporating Nonlinear Optics, vol. 168, 3/89, New York, pp. 83–94.

F. Clerc, "Electro–optical limits of the electrically controlled birefringence effect in nematic liquid crystals," Displays, 10/81, vol. 2, No. 7, Gildford, GB.

G.G. Voevodkin et al., "Optically controllable switches and deflectors based on MIS–LC structures," Soviet Physics Technical Physics, vol. 33, No. 9, 9/88, New York, pp. 1086–1087.

S. Wu, "Infrared properties of nematic liquid crystals: an overview," Optical Engineering, Feb. 1987, vol. 26, No. 2, pp. 120–128.

E. Marom, "Real–time image subtraction using a liquid crystal light value," Optical Engineering, Feb. 1986, vol. 25, No. 2, pp. 274–276.

D.A. Yocky et al., "Simple measurement of the phase modulation capability of liquid crystal phase–only light modulators," Optik 84, No. 4 (1990), pp. 140–144.

Narihiro Yoshida et al., "High resolution spatial light modulator," pp. 357–363, reprinted from Optical Information–Processing System and Architectures 11, 9–13 Jul. 1990, vol. 1347.

T.D. Beard et al., "ac liquid–crystal light valve," Appl. Phys. Lett., vol. 22, No. 3, 2/1/73, pp. 90–92.

T.H. Barnes et al., "Phase–only modulation using a twisted nematic liquid crystal television," Applied Optics, 11–15–89, vol. 28, No. 22, pp. 4845–4852.

Variable Grating Mode Liquid Crystal Device for Optical Processing, Soffer et al., SPIE vol. 218, Devices and Systems for Optical Signal Processing (1980), pp. 81–87.

Patent Abstracts of Japan vol. 14, No. 360 (P–1088) & JP–A–02132412 (Matsushita) May 21, 1990.

Joint Transform Correlator Using a Phase Only Spatial Light Modulator, Barnes et al., Japanese Journal of Applied Physics, Jul. 29, 1990, No. 7, Part 2, pp. 1293–1296.

Effects and Correction of Magneto–Optic Spatial Light Modulator Phase Errors in An Optical Correlator, Downie et al., Applied Optics, Feb. 10, 1992, vol. 31, No. 5, pp. 636–643.

Effects on Nonlinear Parameters in Feedback Joint Transform Correlatro (FJTC) (I), Kasama et al., Optical Information Processing Systems & Architectures IV, vol. 1772, pp. 51–62.

Optical Subtraction of Images with the Use of a Metal–Insulator–Semiconductor–(liquid crystal) Structure, Voevodkin et al., Sov. Tech. Phys. Lett. 14(6), Jun. 1988. pp. 484–486.

Fourier–plane Characteristics of a Liquid Crystal Light Valve, Arsenault et al., Journal of Modern Optics, 1987, vol. 34, No. 11, pp. 1393–1396.

E. Kaneko "Liquid Crystal TV Displays" KTK Scientific Publishers—1987—Chapter 3—pp. 33–43.

"Optical Fingerprint Identification by Binary Joint Transform Correlation", Optical Engineering, vol. 30, No. 12, Dec. 1991, K.H. Fielding et al.

Fielding et al., "Optical fingerprint identification by binary joint transform correlation," *Optical Engineering*, Dec. 1991, vol. 30, No. 12, pp. 1958–1961.

Barnes, et al., "Joint Transform Correlator Using a Phase Only Spatial Light Modulator," *Japanese Journal of Applied Physics*, Jul. 1990, vol. 29, No. 7, pp. L1293–L1296.

Iwaki and Mitsuoka, "Optical pattern recognition of letters by a joint–transform correlator using a ferroelectric liquid–crystal spatial light modulator," *Optical Society of America*, pp. 1218–1220.

T. Yatagai, "Fourier Transform in Optical Computing," Optics, 21, 6, pp. 392–399.

Barnes, "Pattern Recognition with the Use of a Phase Filter in an Optical Correlation System," Applied Physics, 58, 6, 1989, pp. 877–885 (with English Abstract).

Hecht, Light Modulators Help Crunch Image Data, High Technology Jan. 1985, pp. 69–72.

Casasent, "Pattern Recognition: a review", IEEE Spectrum Mar. 1981, pp. 28–33.

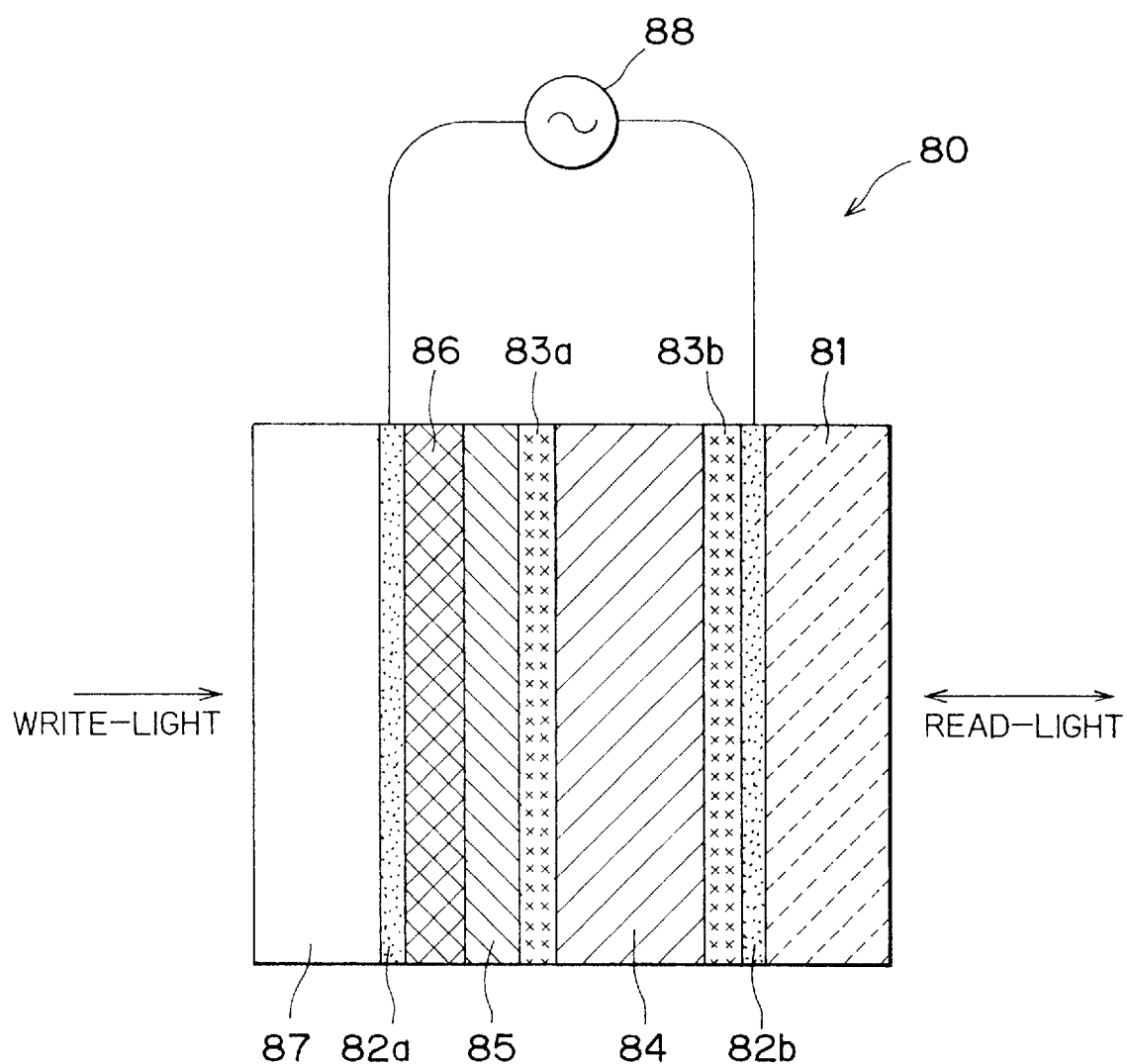

ARBITRARY PERSON'S FINGERPRINT T  SPECIFIC PERSON'S FINGERPRINT R  JOINT IMAGE

JOINT FOURIER TRANSFORM IMAGE

OUTPUT CORRELATION IMAGE

FIG. 11
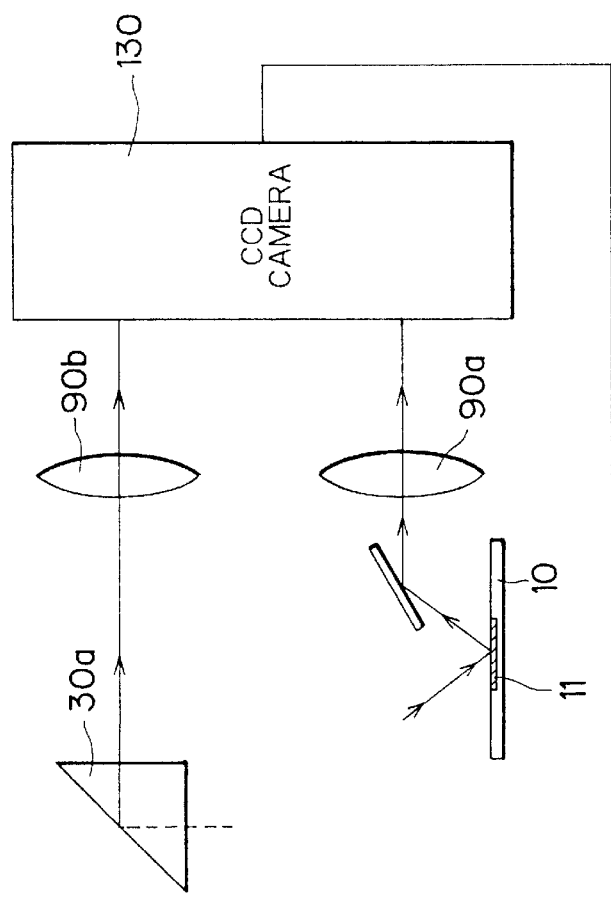
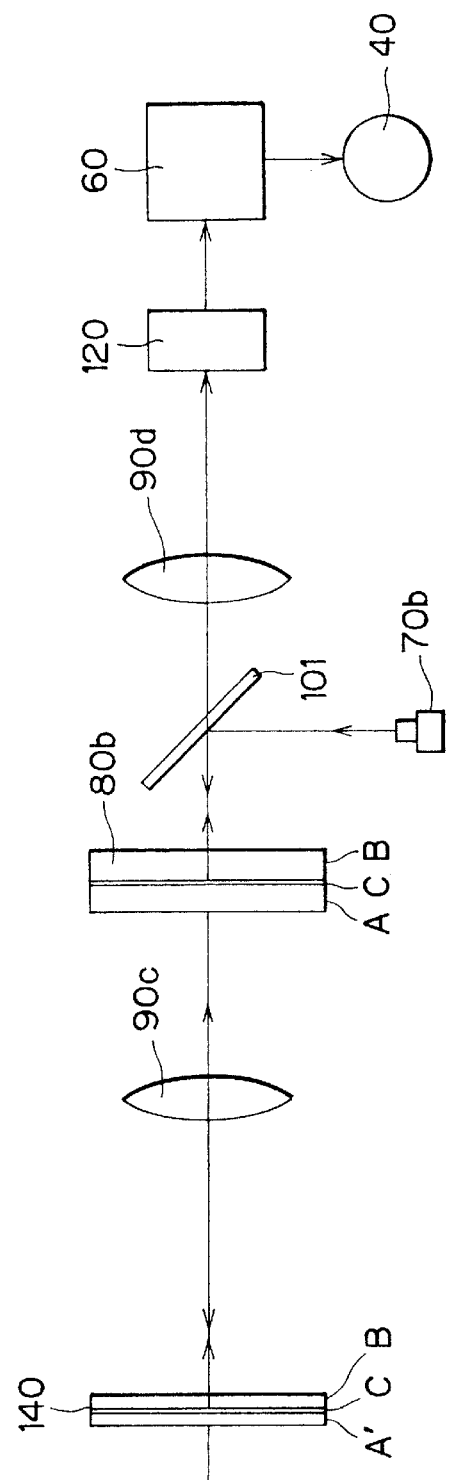

FIG. 12
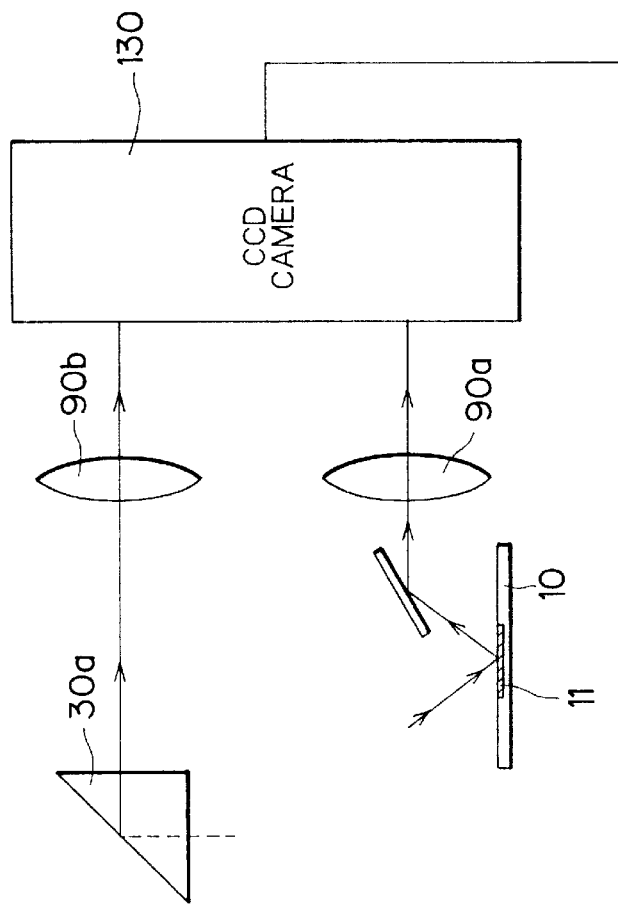
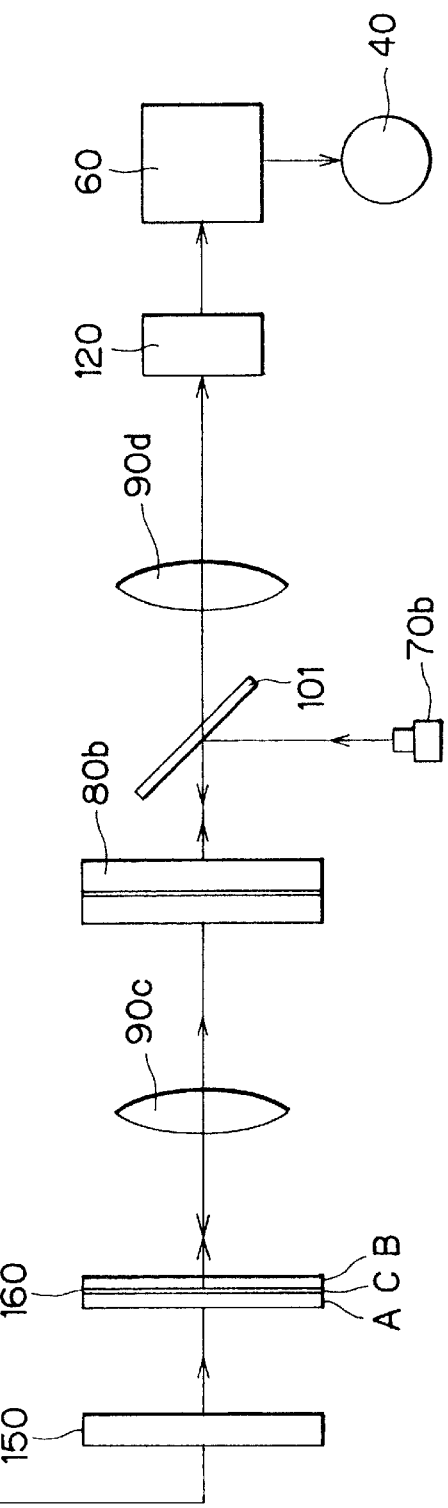

APPARATUS FOR IDENTIFYING AN INDIVIDUAL BASED ON A FINGERPRINT IMAGE

This is a Continuation of application Ser. No. 08/412,218 filed Mar. 27, 1995, now abandoned, which is a Continuation of application Ser. No. 08/113,254, filed Aug. 30, 1993, now abandoned.

BACKGROUND OF THE INVENTION

1. Field of the Invention

The present invention relates to an optical pattern recognition technique, and more particularly to an individual identification apparatus.

2. Description of the Related Art

An optical pattern recognition technique can be applied, for example, to an individual identification apparatus. The individual identification apparatus is provided for identifying an individual under investigation with a specific individual on record. The person under investigation will be referred to as an "arbitrary individual", hereinafter. The individual identification apparatus generally detects a portion of the body of the arbitrary person and a portion of the body of the specific person. For example, an optical fingerprint identification apparatus has been proposed for detecting fingerprints of the arbitrary person and the specific person.

An optical fingerprint identification apparatus of a type has been developed that detects ending or turning points of ridges or ridge lines (minutiae) of a fingerprint of a specific individual and of a fingerprint of an arbitrary individual. More specifically, this apparatus detects positions of ending or turning points of the ridges, types of the ridges, and directions in which the ridges extend. The detected results recognize, as a match or a mismatch, the fingerprints of the arbitrary person and the specific person. This apparatus is known for being capable of high precision identification. However, this apparatus is disadvantageous in that extracting the characteristics of the minutiae requires a great amount of time, and also, the apparatus has a large scale. In addition, this apparatus previously stores therein information on the fingerprint of the specific individual. Thus storing private informations will invade privacy of the specific individual.

In order to solve the problem with protecting privacy, another type of optical fingerprint identification apparatus has been proposed. This type of apparatus operates in combination with a card which stores therein information on the fingerprint of the specific person. Thus combining the apparatus with the card does not necessitate storing the information on the specific person's fingerprint in the apparatus, per se.

Japanese Unexamined Patent Application Publication No.3-77176 has proposed this type of fingerprint identification apparatus which employs an optical pattern correlation technique with the use of a hologram pattern. The card to be used in combination with this apparatus records therein a Fourier Transform hologram pattern for a fingerprint of the specific individual. The apparatus utilizes the hologram pattern as a spatial filter. More specifically, light bearing thereon a fingerprint of an arbitrary person to be identified with the specific person is Fourier Transformed and irradiated on the Fourier Transform hologram pattern on the card so as to form a correlation image. The correlation image represents correlation of the fingerprints of the arbitrary person and the specific person. This apparatus is, however, disadvantageous in that there is a need to accurately coincide an optical axis of the fingerprint-bearing light with a zero order part of the Fourier Transform hologram pattern. In other words, the apparatus requires highly precisely positioning the optical axis of the light with respect to the hologram pattern. Accordingly, this apparatus is not practically applicable.

This type of fingerprint identification apparatus has been proposed also by Japanese Unexamined Patent Application Publication No.63-201795. The card to be used in combination with this apparatus prerecords therein a hologram image of a fingerprint of the specific person. In the apparatus, object beam bearing thereon an image of the fingerprint of an arbitrary person is illuminated on the hologram image, to thereby produce a beam. If the arbitrary person is the same as the specific person, the generated beam coincides with a reference beam which has been utilized to produce the hologram image. Accordingly, detecting the generated beam determines the correlation between the arbitrary person and the specific person. This apparatus, however, requires precisely positioning the image of the arbitrary person's fingerprint on the hologram image. Accordingly, this apparatus is not practically applicable.

SUMMARY OF THE INVENTION

It is therefore, an object of the present invention to overcome the above-described drawbacks, and to provide an individual identification apparatus which can have high tolerance in regards to the positions where the images of the body portions of the arbitrary person and the specific person are placed, and also can perform quick and easy identification of individuals while superiorly maintaining people's privacy.

In order to solve the above object, an individual identifying apparatus of the present invention employs an optical system for attaining Joint Transform Correlation processings.

Joint Transform Correlation (JTC) has been proposed in "Fourier Transform in Optical Information Processings" (Optics, 21, 6, pp.392–399). The Joint Transform Correlation processing does not necessitate the precise positioning of images to be correlated. In addition, since the Joint Transform Correlation processing is a so-called parallel optical processing, it becomes possible to quickly measure the identification of individuals.

Accordingly, the present invention provides an individual identification apparatus for measuring correlation between a body portion of a specific individual and a body portion of an arbitrary individual to thereby positively or negatively identify the arbitrary individual as the specific individual, the individual identification apparatus comprising: first positioning means for positioning, at a first position, a portion of a body of an arbitrary individual to be identified with a specific individual; first reading means for irradiating light onto the portion of the body of the arbitrary individual which is positioned at the first position to obtain an optical image of the portion of the body of the arbitrary individual; first spatial light modulating means for receiving an optical joint image of the image of the portion of the body of the arbitrary individual and an image of a portion of a body of a specific individual, the optical joint image having the image of the portion of the body of the specific individual and the image of the portion of the body of the arbitrary individual at different positions, the first spatial light modulating means receiving and modulating read-light in accordance with the joint image;

a lens for Fourier transforming the read-light modulated by and outputted from the first spatial light modulating means to thereby produce an optical Joint Fourier Transform image; second spatial light modulating means for receiving the optical Joint Fourier Transform image and receiving and modulating read-light in accordance with the Joint Fourier Transform image; a lens for Fourier transforming the read-light modulated by and outputted from the second spatial light modulating means to thereby produce an optical output correlation image; intensity detecting means for detecting intensity of the optical output correlation image; and calculating means for comparing a value of the detected intensity with a predetermined threshold value so as to judge correlation of the image of the portion of the body of the specific individual and the image of the portion of the body of the arbitrary individual to thereby determine whether or not the arbitrary individual and the specific individual are the same individual.

The first spatial light modulating means preferably includes an optically-addressable spatial light modulator which has an optically-addressing part and a modulating part, the optically-addressing part receiving the optical joint image and changing optical characteristic of the modulating part in accordance with the optical joint image, the modulating part receiving and modulating the read-light in accordance with the changed optical characteristic.

The second spatial light modulating means preferably includes an optically-addressable spatial light modulator which has an optically-addressing part and a modulating part, the optically-addressing part receiving the optical Joint Fourier Transform image and changing optical characteristic of the modulating part in accordance with the optical Joint Fourier Transform image, the modulating part receiving and modulating the read-light in accordance with the changed optical characteristic.

The first spatial light modulating means may include: image pick-up means for picking up the optical joint image and for converting the optical joint image into an electrical joint image; and an electrically-addressable spatial light modulator which has an electrically-addressing part and a modulating part, the electrically-addressing part receiving the electrical joint image and changing optical characteristic of the modulating part in accordance with the electrical joint image, the modulating part receiving and modulating the read-light in accordance with the changed optical characteristic.

The second spatial light modulating means may include: image pick-up means for picking up the optical Joint Fourier Transform image and for converting the optical Joint Fourier Transform image into an electrical Joint Fourier Transform image; and an electrically-addressable spatial light modulator which has an electrically-addressing part and a modulating part, the electrically-addressing part receiving the electrical Joint Fourier Transform image and changing optical characteristic of the modulating part in accordance with the electrical Joint Fourier Transform image, the modulating part receiving and modulating the read-light in accordance with the changed optical characteristic.

According to the individual identification apparatus of the present invention, information on the portion of the body of the specific individual is preferably recorded in an external storing device provided separately from the individual identification apparatus. The individual identification apparatus of the present invention therefore further comprises information readout means for reading out the information from the external storing device to obtain an optical image of the portion of the body of the specific individual, the information readout means supplying the optical image of the portion of the body of the specific individual to the first spatial light modulating means so as to allow the first spatial light modulating means to receive the optical joint image.

The external storing device may preferably include a card provided separately from the individual identification apparatus. In such a case, the information readout means preferably includes: second positioning means for positioning the card at a second position; and second reading means for irradiating light onto the card which is positioned at the second position and reading out the information from the card to obtain the optical image of the portion of the body of the specific individual.

The individual identification apparatus may further comprise: first detecting means for detecting that the part of the body of the arbitrary individual is positioned on the first position; transporting means for transporting the card to the second position; second detecting means for detecting that the card is transported to the second position; and controlling means for controlling the calculating means to start comparing the value of the detected intensity with the predetermined threshold value after when the first detecting means detects that the portion of the body of the arbitrary individual is placed at the first position and the second detecting means detects that the card is transported to the second position.

According to another aspect, the present invention provides a fingerprint identification apparatus for measuring correlation of an image of a fingerprint of a specific individual and an image of a fingerprint of an arbitrary individual to thereby determine whether or not the arbitrary individual is identified with the specific individual, the fingerprint identification apparatus comprising: first spatial light modulating means for receiving information on a joint image of an image of a fingerprint of a specific individual and an image of a fingerprint of an arbitrary individual to be identified with the specific individual and for receiving first read-light to spatially modulate the first read-light in accordance with the joint image; a first Fourier transform lens for receiving the first read-light modulated by and outputted from the first spatial light modulating means and spatially Fourier transforming the first read-light to thereby allow the first read-light to form a Joint Fourier Transform image for the image of the fingerprint of the specific individual and the image of the fingerprint of the arbitrary individual; second spatial light modulating means for receiving the Joint Fourier Transform image and for receiving second read-light to spatially modulate the second read-light in accordance with the Joint Fourier Transform image; a second Fourier transform lens for receiving the second read-light modulated by and outputted from the second spatial light modulating means and spatially Fourier transforming the second read-light to thereby allow the second read-light to form a pair of correlation peaks representative of correlation of the image of the fingerprint of the specific individual and the image of the fingerprint of the arbitrary individual; correlation detecting means for detecting intensity of one of the pair of correlation peaks; and calculating means for comparing a value of the detected intensity with a predetermined threshold value so as to judge correlation of the image of the fingerprint of the specific individual and the image of the fingerprint of the arbitrary individual to thereby determine whether or not the arbitrary individual is identified with the specific individual, wherein at least one of the first and second spatial light modulating means includes an optically-addressable SLM which has an optically-addressing part for receiving an optical image and an modulation part having an optical characteristic, the optically-addressing part changing the optical characteristic of the modulation part dependently on the received optical image, the modulation part receiving and modulating read-light in accordance with the changed optical characteristic.

BRIEF DESCRIPTION OF THE DRAWINGS

The above and other objects, features and advantages of the invention will become more apparent from reading the following description of the preferred embodiment taken in connection with the accompanying drawings in which:

FIG. 6 is a sectional view of schematically showing a spatial light modulator employed in the fingerprint identification apparatus of the embodiment;

FIG. 7($b$) schematically shows the state how the nematic liquid crystal molecules are tilted where electric voltage is applied;

FIG. 8($b$) shows the Joint Fourier Transform intensity distribution obtained based on the images of fingerprints of FIG. 8($a$);

FIG. 8($c$) shows the output correlation intensity distribution obtained based on the Joint Fourier Transform intensity distribution of FIG. 8($b$);

FIG. 11 shows a modification of the fingerprint identification apparatus;

FIG. 12 shows another modification of the fingerprint identification apparatus.

DETAILED DESCRIPTION OF THE PREFERRED EMBODIMENT

Figure 1:
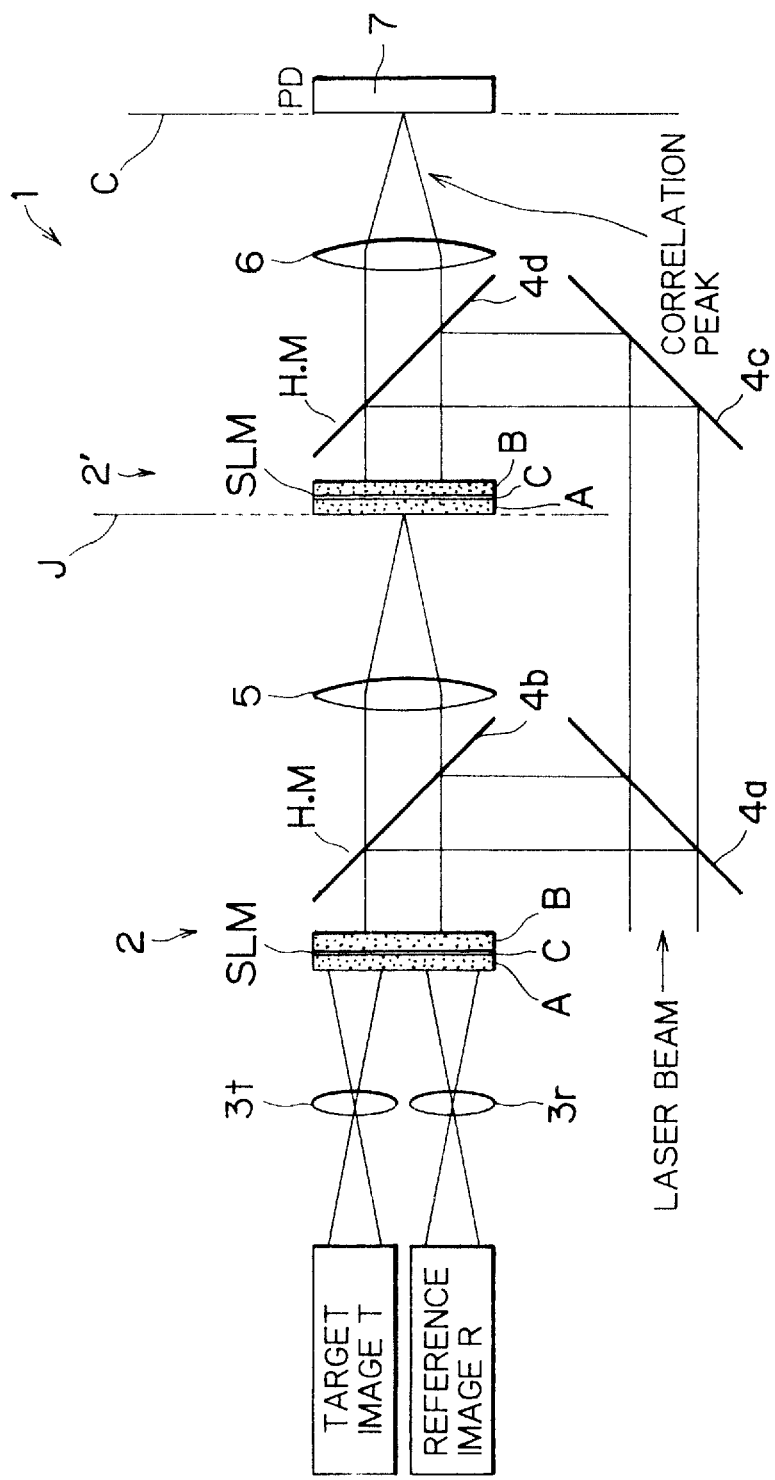
FIG. 1 shows an optical system of the present invention for achieving Joint Fourier Transform processing.

Referring to the accompanying drawings, a preferred embodiment of the invention will be described wherein like parts and components are designated by the same reference numerals to avoid duplicating description.

An individual identification apparatus of a preferred embodiment of the present invention employs an optical system for achieving the Joint Transform Correlation processing. A basic structure of the optical system is schematically shown in FIG. 1. This optical system 1 (which will be referred to as a "JTC system 1," hereinafter) serves for measuring correlation of a target image T (corresponding to an arbitrary person's fingerprint image) and a reference image R (corresponding to a specific person's fingerprint image) through the Joint Transform Correlation processing. According to the present invention, the optical system 1 utilizes optically-addressable spatial light modulators (SLMs).

Figure 2:
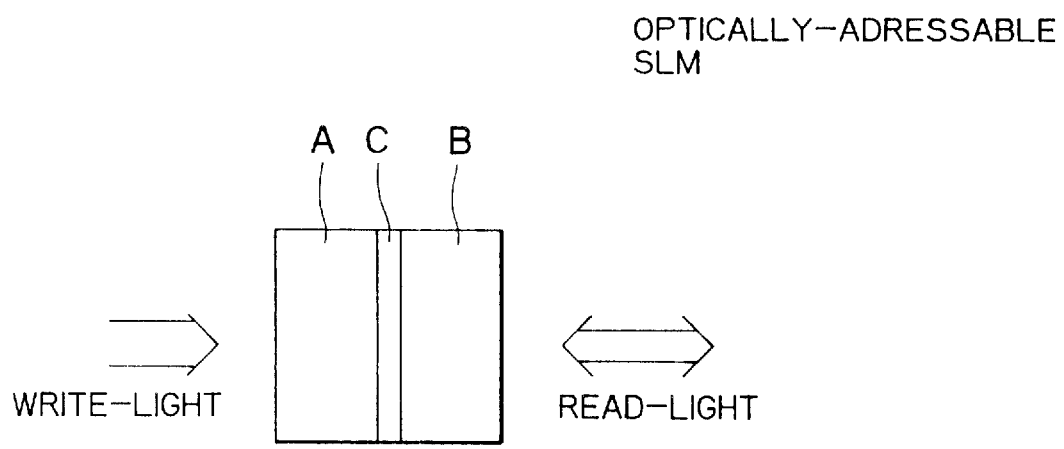
FIG. 2 schematically shows a basic structure of an optically-addressable SLM.

As shown in FIG. 2, an optically-addressable SLM mainly includes: an optically-addressing part A; a modulating part B; and an isolating layer C provided between the parts A and B. The optically-addressing part A receives coherent or incoherent write-light bearing a two-dimensional intensity distribution (i.e., an optical image). The optically-addressing part A alters optical characteristic of the modulation part B in accordance with the received optical image. The modulation part B receives and modulates coherent read-light in accordance with the altered optical characteristic. The optically-addressable SLM therefore modulates coherent read-light in accordance with the received optical image. The isolating layer C is provided for isolating the write-light and the read-light. The read-light projected into the modulating part B travels in the modulating part and is modulated therein. The light reaches the isolating layer C and reflects off the isolating layer C and continues propogating in the modulating part B where it is further modulated. The modulated read-light output from the modulation part B. The SLM provided with the isolating layer C is therefore called a "reflection type" SLM.

In the JTC system 1 of the present invention, as shown in FIG. 1, a lens 3$t$ is provided for receiving write-light bearing the target image T. The lens 3$t$ focuses the write-light onto an optically-addressing part A of a first optically-addressed SLM 2 so as to image the target image T onto the optically-addressing part A. Similarly, another lens 3$r$ is provided for receiving write-light bearing the reference image R. The lens 3$r$ focuses the write-light onto the optically-addressing part A of the SLM 2 so as to image the reference image R onto the optically-addressing part A. The positional relationship between the lenses 3$t$ and 3$r$ is selected to input the images R and T in the optically-addressing part A at its different positions. Thus, a joint image of the images T and R where the images are placed side by side is incident in the optically-addressing part A. As a result, the optical characteristic of the modulation part B changes in accordance with the joint image.

A part of coherent light (laser beam) splitted off at a half mirror 4$a$ reflects at a half mirror 4$b$. The laser beam is introduced to the modulation part B of the SLM 2. The laser beam serves as read-light. In other words, the laser beam is modulated or diffracted in the modulation part B according to the joint image. The thus modulated read-light outputs from the SLM 2 and passes through the half mirror 4$b$. The read-light is then Fourier transformed by a Fourier transform lens 5. As a result, a Joint Fourier Transform intensity distribution (or a Joint Fourier Transform image) is produced on a focal plane of the lens 5, that is, on a joint Fourier Transform plane J. The Joint Fourier Transform image is called Joint Power Spectrum. An optically-addressing part A of a second optically-addressable SLM 2' is positioned on the plane J. Accordingly, the Joint Fourier Transform image is incident in the optically-addressing part A of the SLM 2'. As a result, the optical characteristic of the modulation part B of the SLM 2' changes in accordance with the Joint Fourier Transform image.

Remaining part of laser beam that passes the half mirror 4a is reflected by a mirror 4c. The laser beam is then partly reflected at another half mirror 4d to be introduced into the modulation part B of the SLM 2'. The laser beam serves as read-light. In other words, the laser beam is modulated or diffracted in the modulation part B according to the joint Power Spectrum. The thus modulated read-light outputs from the SLM 2' and passes through the half mirror 4d. The read-light is then Fourier transformed by another Fourier transform lens 6. As a result, an output correlation intensity distribution (or an output correlation image) is produced on a focal plane of the Fourier Transform lens 6 (which will be referred to as an "output correlation plane C," hereinafter.)

The output correlation intensity distribution includes a zero order diffraction peak and a pair of first ((+1)-th and (−1)-th) order diffraction peaks. The pair of first order diffraction peaks are located symmetrically on the opposite sides of the zero order diffraction peak. A distance between the (+1)-th order diffraction peak and the zero order diffraction peak and a distance between the (−1)-th order diffraction peak and the zero order diffraction peak are equal to each other and correspond to a distance between the target image T and the reference image R incident on the SLM 2. Intensity of the zero order diffraction peak corresponds to intensities of the target image T and the reference image R. Intensities of the first order diffraction peaks are equal to each other and correspond to correlation of the images T and R. Accordingly, the first order diffraction peaks are called correlation peaks.

An intensity detector 7 such as a photodiode is located on the output correlation plane C at such a position as is capable of detecting intensity of one of the first order diffraction peaks. The intensity detector 7 therefore outputs an electrical correlation signal representative of the intensity of the first order diffraction peak, i.e., the correlation of the images T and R.

As described above, in the JTC system 1 of the present invention, the optically-addressable SLM 2 is provided for diffracting coherent beam in accordance with the joint image of the images R and T. The SLM 2 cooperates with the Fourier Transform lens 5 to produce the Joint Power Spectrum. The optically-addressable SLM 2' is further provided for diffracting coherent beam in accordance with the joint Power Spectrum. The SLM 2' cooperates with the Fourier Transform lens 6 to produce the output correlation peaks. It is noted that the optically-addressable SLM can directly receive an optical image born on write-light and accordingly modulate read-light. Therefore, the JTC system 1 employed with the SLMs 2 and 2' has a simple structure. In addition, the JTC system 1 can perform its Joint Transfer Correlation processing in a short period of time, resulting in a high speed measurement.

Figure 3:
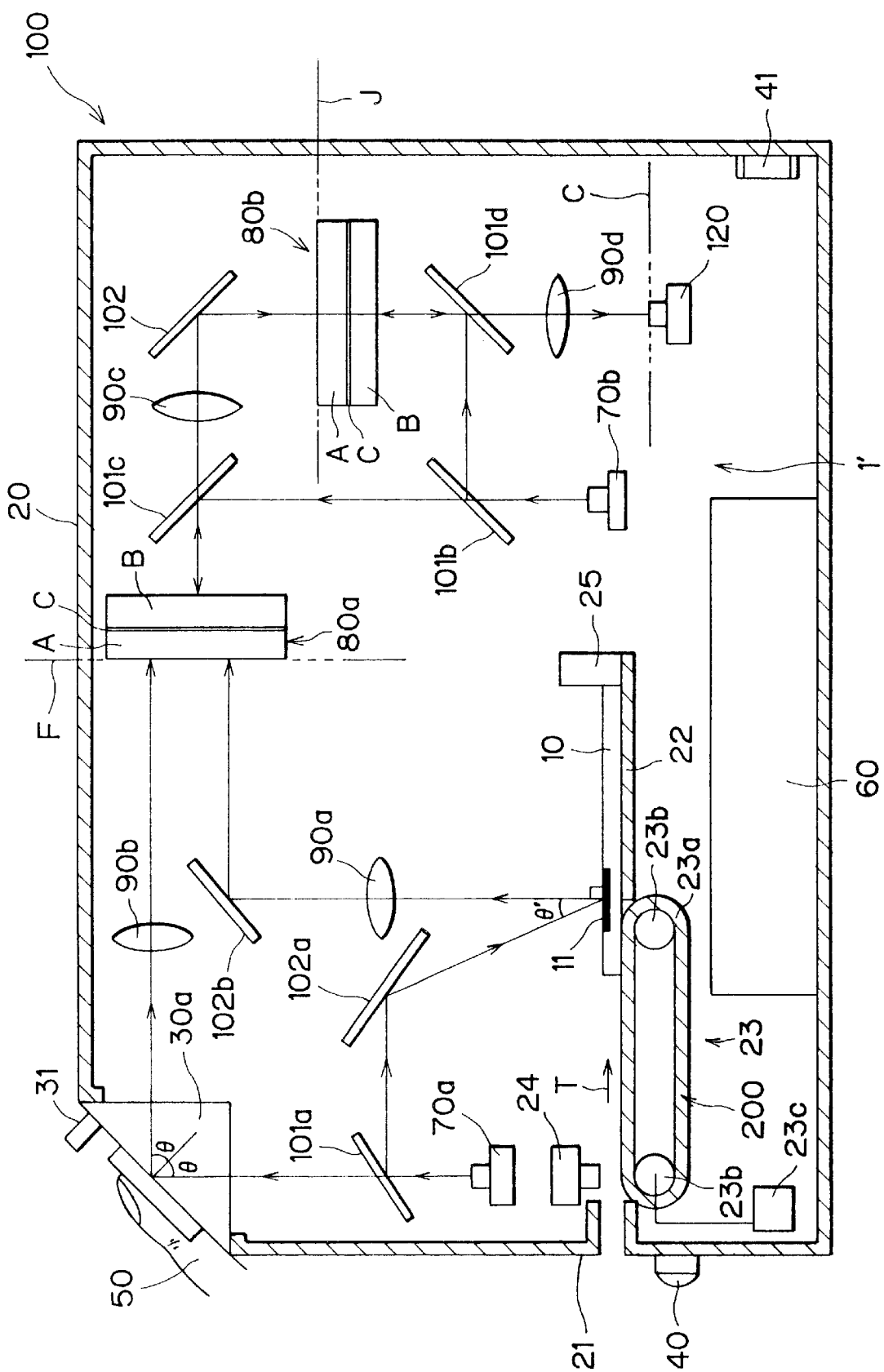
FIG. 3 schematically shows a fingerprint identification according to an embodiment of the present invention.

FIG. 3 shows one concrete example of an optical fingerprint identification apparatus to which applied is the above-described JTC system 1. The fingerprint identification apparatus 100 is suited for secure entry systems to identify individuals for access to a restricted area or room, etc. The fingerprint identifying apparatus 100 operates in combination with an item, for example, a card (for example, a credit card or an identification card) 10 recorded with a hologram pattern 11. More specifically, a fingerprint of a specific person is prerecorded on the card 10 as the hologram pattern 11. The fingerprint identification apparatus therefore serves to read out the fingerprint recorded as the hologram pattern 11 and to correlate it with a fingerprint of a finger 50 of an arbitrary person to be identified with the specific person.

This fingerprint identifying apparatus 100 includes: a casing 20; a standard 90-deg prism 30a provided at a cut-off upper corner of the casing 20; a card insert/discharge slot 21 opened in one side of the casing 20 for receiving the card 10; a control portion 60 provided at the lower portion of the casing 20; and an optical system (to be described later) 1' for achieving the JTC processing. The optical system 1' is provided internally in the casing 20 and corresponds to the JTC system 1 of FIG. 1. The fingerprint identifying apparatus 100 further includes a display device 40 (for example, an LED or liquid crystal display) provided at a predetermined position on the one side of the casing 20 and an output terminal 41 provided at a predetermined position on the other side of the casing 20.

Inside the casing 20, a card insert detector (for example, a photocoupler) 24 is provided in the vicinity of the card insert/discharge slot 21. The detector 24 detects the card 10 being conveyed in front of the detector 24 and outputs a signal indicating that the card is being inserted into or discharged out from the casing 20. A transport mechanism 23 is provided for transporting the card 10 in a direction (represented by an arrow T in FIG. 3) from the card insert/discharge slot 21 toward a card positioning stand 22. (It is noted that the transport mechanism also serves to transport the card from the card positioning stand 22 back to the slot 21.) The card positioning stand 22 is located at a fixed position inside of the casing 20. The transport mechanism 23 includes: an endless belt 23a made from a material, for example, rubber, which prevents the card 10 from sliding during transport; a pair of rollers for conveying the belt 23a; and a driving motor 23c for rotating the rollers 23b. The card positioning stand 22 is formed with a card set completion detector (for example, a pressure sensor) 25, at its leading edge in the card transporting direction T. When the card 10 is conveyed by the transport mechanism 23 in the direction T and a leading edge of the card 10 contacts the card set completion detector 25, the detector 25 outputs a signal indicating that the card 10 is fully or properly positioned on the card positioning stand 22.

Figure 4:
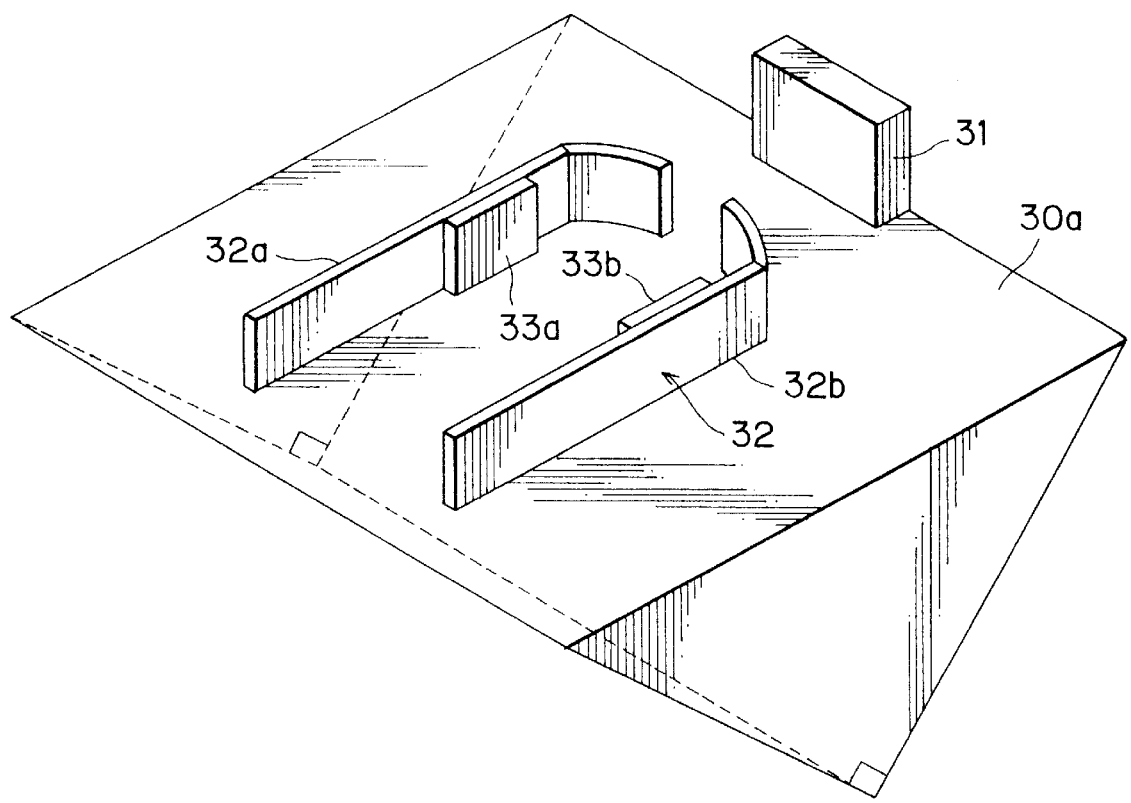
FIG. 4 is a schematic perspective view of a prism provided on the fingerprint identification apparatus of the embodiment.

As shown in FIGS. 3 and 4, the prism 30a is provided with a finger guide 32 for guiding the arbitrary person's finger 50 to a predetermined position on the outer surface of the hypotenuse of the prism. The finger guide 32 is made from a pair of opposing resilient guide plates 32a and 32b that curve inward at their tips. The guide plates 32a and 32b are fixedly secured to the surface of the prism at their curved tip portions. The portions of the guide plates 32a and 32b which are freely movable with respect to the surface of the prism can smoothly guide the finger 50 onto the prism 30a. Touch switches (for example, a pressure sensor) 33a and 33b are provided to the inner walls of the guide plates 32a and 32b. When the finger 50 is inserted between the guide plates 32a and 32b, the touch switches 33a and 33b output signals indicating that the finger 50 is properly placed between the guide plates 32a and 32b.

The pair of guide plates 32a and 32b confront with each other at their tip ends with a small gap being formed therebetween. A pyroelectric detector 31 is provided on the prism 30a at such a position confronting the small gap. Accordingly, the pyroelectric detector 31 can confront, via the small gap, a tip end of the finger 50 which is placed between the guide plates 32a and 32b. The pyroelectric detector 31 can detect infrared light emitted from a living object, i.e., the finger 50. When the finger 50 is placed between the guide plates 32a and 32b, the pyroelectric detector 31 outputs a signal indicating that the finger 50 is properly placed between the guide plates 32a and 32b.

In the optical system 1' internally provided to the casing 20, a first semiconductor laser (hereinafter referred to a LD)

70a is provided for illuminating both the arbitrary person's finger 50 and the hologram pattern 11. More specifically, a first half mirror 101a is provided for receiving laser light outputted from the first LD 70a. A part of the laser light that passes through the half mirror 101a is introduced to the prism 30a. The other part that reflects off at the half mirror 101a is introduced to the card positioning stand 22. The LD 70a is positioned for emitting laser beam in such a direction that the laser beam may enter one side of the prism 30a and strike the hypotenuse at a first predetermined incident angle θ which is larger than the critical angle $θ_c$ of the prism. Accordingly, the laser beam is totally internally reflected at the internal surface of the hypotenuse. When the finger 50 is placed on the hypotenuse of the prism 30a, however, the ridges of the fingerprint selectively contact with the external surface of the prism. The ridges thus contacted with the hypotenuse change the boundary condition of the hypotenuse so as to suppress the total internal reflection. Accordingly, laser beam reaching the hypotenuse at such a position as contacted with the ridges transmits further into the skin of the finger where the laser beam will be largely attenuated. Laser beam thus reflected or diffracted by the finger 50 at the hypotenuse therefore bears thereon an image of the fingerprint of the finger, i.e., the target image T. A second lens 90b is provided for receiving the laser beam reflected from the hypotenuse and focusing it onto its focal plane. Accordingly, the fingerprint of the arbitrary person's finger 50, i.e., the target image T is imaged on the focal plane of the lens 90b.

A first incident angle adjustment mirror 102a is provided for receiving the part of the laser light having been reflected at the half mirror 101a. The mirror 102a serves to guide the laser light toward the hologram pattern 11 of the card 10 which is properly positioned on the positioning stand 22. 102b rotational angle of the mirror 102b is adjusted so as to introduce the laser light onto the hologram pattern 11 at a second predetermined incident angle θ.

The second incident angle θ will be described hereinafter.

Figure 5:
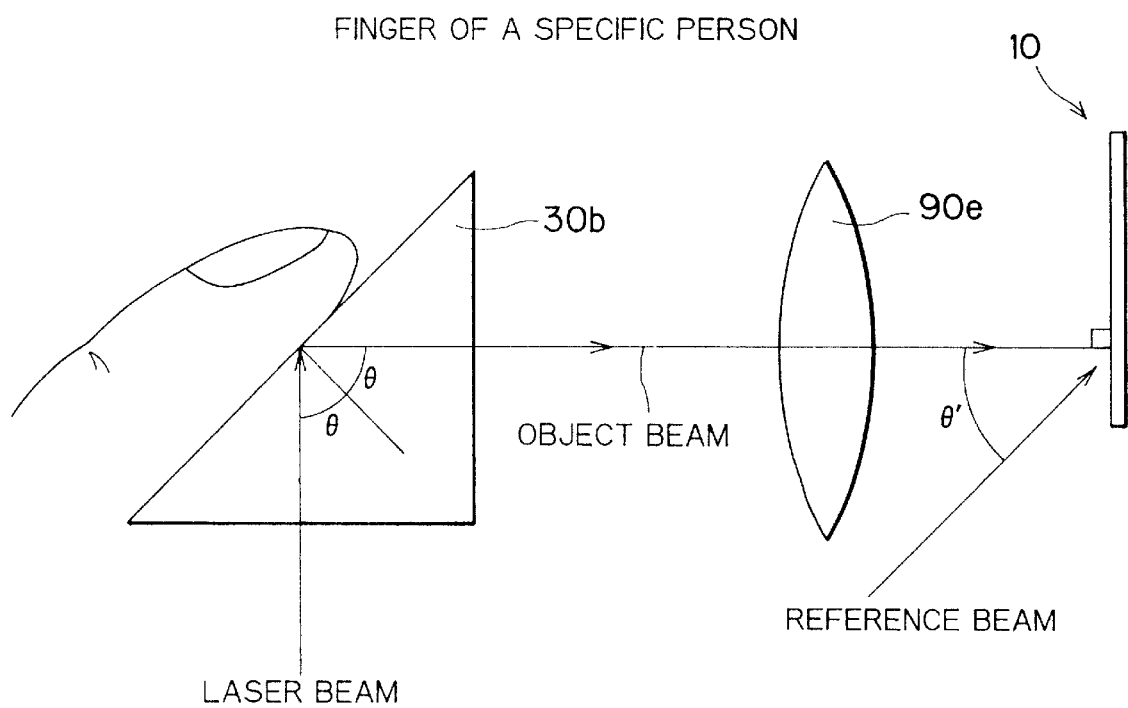
FIG. 5 schematically shows an apparatus for producing a hologram portion on a card.

The hologram image 11 has been previously recorded on the card 10 in a hologram producing apparatus. FIG. 5 shows a basic structure of the hologram producing apparatus. In the hologram producing apparatus, the specific person's finger is positioned on a hypotenuse of a standard 90-degree prism 30b. The prism 30b is the same as the prism 30a. A single laser source (not shown) irradiates laser beam so that the laser beam may enter one side of the prism 30b and strike the hypotenuse at the incident angle θ. The incident angle θ is larger than the critical angle $θ_c$ of the prism 30b and is equal to the first incident angle θ with respect to the prism 30a. The laser beam therefore undergoes the total internal reflection and bears thereon the image of the specific person's fingerprint. The beam is therefore called an objective beam. A lens 90e focuses the object beam onto its focal plane to image the fingerprint thereon. The card 10 is placed on the focal plane, so that the fingerprint image is imaged on the card 10. The single laser source also directly irradiates the card 10 with the laser beam at the second incident angle θ'. The thus directly illuminated laser beam is called a reference beam. The object beam and the reference beam interferes, and the interference pattern is recorded in the card 10 as the hologram pattern 11.

The hologram pattern 11 has been recorded in the card 10 in the above-described manner. Accordingly, illuminating laser beam onto the hologram pattern 11 at the incident angle θ' produces a reflection beam which is reflected normally from the hologram and which properly reconstructs the image of the specific person's fingerprint. In the fingerprint identification apparatus 100, the first incident angle adjusting mirror 102a serves to radiate laser beam on the hologram pattern 11 at the incident angle θ'. Accordingly, the reflection beam reflected or diffracted at the hologram pattern 11 bears thereon the specific person's fingerprint image, i.e., the reference image R. A first lens 90a is located at such a position as is capable of receiving the reflection beam and for focusing it onto its focal plane. Accordingly, the specific person's fingerprint image, i.e., the reference image R is imaged on the focal plane.

A second incident angle adjusting mirror 102b is provided in the optical path of the laser beam from the lens 90a so that the focal plane of the lens 90a may coincide with the focal plane of the lens 90b. Accordingly, the target image T and the reference image R are jointly imaged or formed on the same plane. In other words, a joint image of the images T and R where the images are placed side by side is formed on the same plane. A positional relationship between the mirror 102b and the prism 30a determines a distance between the images T and R in the joint image.

A first optically-addressable SLM 80a is placed such that an optically-addressing part A thereof is positioned on the focal planes of the lenses 90a and 90b. Accordingly, the joint image of the target image T (fingerprint of the arbitrary person) and the reference image R (fingerprint of the specific person) is incident in the addressing part of the SLM 80a. As a result, the optical characteristic of a modulating part B of the SLM 80a varies in accordance with the joint image. In other words, the joint image is written in the first SLM 80a.

A second semiconductor laser source (hereinafter referred to a second LD) 70b is provided for radiating laser beam both onto the modulating part B of the first SLM 80a and a modulating part B of a second SLM 80b which will be described later. More specifically, a half mirror 101b is provided for receiving the laser beam outputted from the LD 70b. A part of the laser beam that passes through the half mirror 101b is introduced to a half mirror 101c. The remaining part of the laser beam that reflects off the half mirror 101b is introduced to a half mirror 101d. The half mirror 101c reflects off the part of the received laser beam to guide it to the modulating part B of the first SLM 80a. The laser beam serves as read-light with respect to the SLM 80a. In other words, the laser beam is modulated or diffracted in the modulating part B in accordance with the joint image, and outputs therefrom. Thus, the laser beam reads out the joint image written in the first SLM 80a. The laser beam outputted from the SLM 80a therefore bears thereon the joint image of the reference image R and the target image T. The laser beam then passes through the half mirror 101c. There is provided a third lens 90c for receiving and Fourier transforming the laser beam. Accordingly, a Joint Power Spectrum is obtained on a focal plane of the lens 90c, i.e., on a Joint Fourier Transform plane J. A mirror 102 is provided in the optical path of the laser beam from the lens 90c. A second SLM 80b is located at such a position that an optically-addressing part A thereof is located on the plane J. Accordingly, the Joint Power Spectrum is incident on the addressed part A. The modulating part B of the SLM 80b therefore varies in its optical characteristic in accordance with the Joint Power Spectrum. In other words, the Joint Power Spectrum is written in the SLM 80b.

The part of laser light reflected at both the half mirror 101b and the half mirror 101d is introduced into the modulating part B of the SLM 80b. The laser beam serves as read-light with respect to the SLM 80b. That is, the laser beam is modulated or diffracted in the modulating part B in accordance with the Joint Power Spectrum, and outputs therefrom. In other words, the laser beam reads out the Joint Power Spectrum written in the SLM 80b. As a result, the laser beam outputted from the SLM 80b bears thereon the Joint Power Spectrum. A fourth lens 90d is provided for receiving and Fourier transforming the laser beam outputted from the second SLM 80b. Accordingly, an output correlation image is obtained on a focal plane of the lens 90d, i.e., on an output correlation plane C.

An intensity detector 120 such as a photodiode is located on the output correlation plane C at such a position as is capable of detecting intensity of one of the first order diffraction peaks of the output correlation image. The intensity detector 120 therefore outputs an electric correlation signal representative of the intensity of the first order diffraction peak, i.e., the correlation of the images T and R.

Figure 8A:
FIG. 8($a$) shows the state how the images of the fingerprints of a specific person and an arbitrary person to be identified with the specific person are arranged to form a joint image incident on the SLM 80$a$.
Figure 8B:
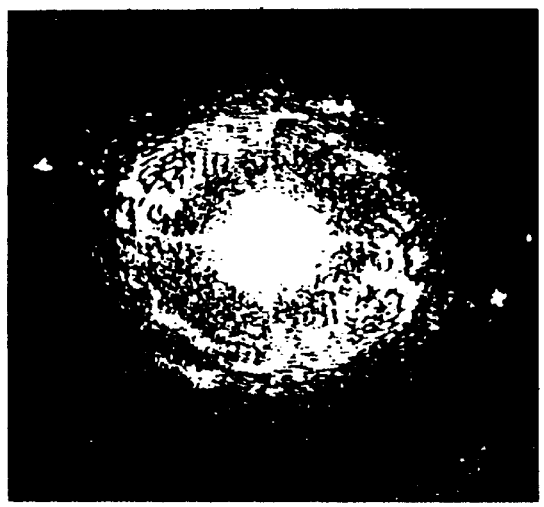
Figure 8C:
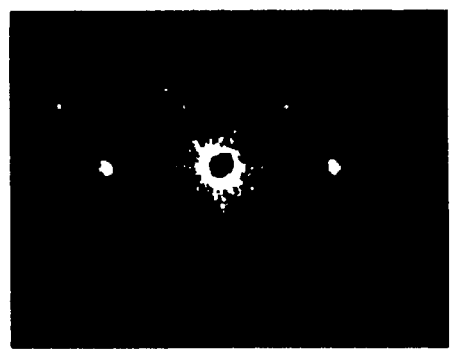

According to the above-described optical system 1', the joint image as shown in FIG. 8(a) is incident in the addressing part A of the SLM 80a, for example. The joint image includes the fingerprint reference image R and the fingerprint target image T which are placed side by side. Based on this joint image, a Joint Fourier Transform as shown in FIG. 8(b) is obtained on the plane J, and an output correlation image as shown in FIG. 8(c) is obtained on the plane C. FIG. 8(c) shows that a pair of first order peaks occur symmetrically on the opposite sides of a zero order peak.

FIG. 6 schematically shows a structure of one example for the optically-addressable SLM 80a according to the embodiment of the present invention. The SLM 80a has a sandwich structure in which a transparent electrode film 82a, an photosensing layer 86, a dielectric mirror layer 85, an alignment layer 83a, a liquid crystal layer 84, the other alignment layer 83b and the other transparent electrode film 82b are sandwiched between a write side fiber plate 87 and a readout side glass plate 81. The photosensing layer 86 serves as the optically-addressing part A. Write-light bearing a two-dimensional distribution of intensity (optical image) is projected onto the photosensing layer 86 through the fiber plate 87 and the electrode film 82a. An optically addressable material with a large dark resistance rate (resistance rate in total darkness) is preferably used in the photosensing layer 86. Use of photoelectric material in which resistance rate drops greatly upon exposure to incident write-light is desirable. For example, amorphous silicon (a-Si) photoconductive element is used in the present embodiment. It is noted that hydrogenated amorphous silicon (a-Si:H) can be used for the photosensing layer 86. The dielectric mirror layer 85 serves as the isolating layer C.

Figure 7A:
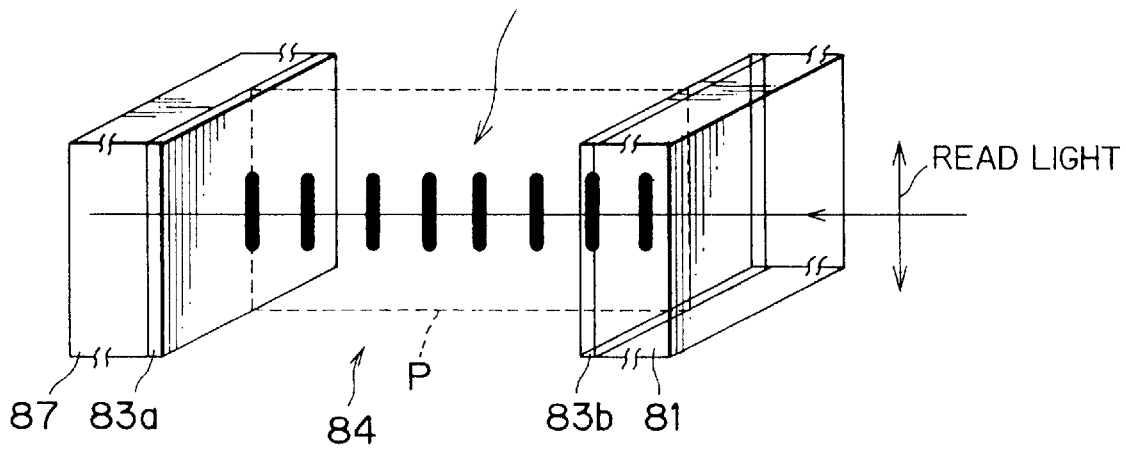
FIG. 7($a$) schematically shows the state how nematic liquid crystal molecules are homogeneously arranged in the liquid crystal layer of the SLM of FIG. 6 where no electric voltage is applied.
Figure 7B:
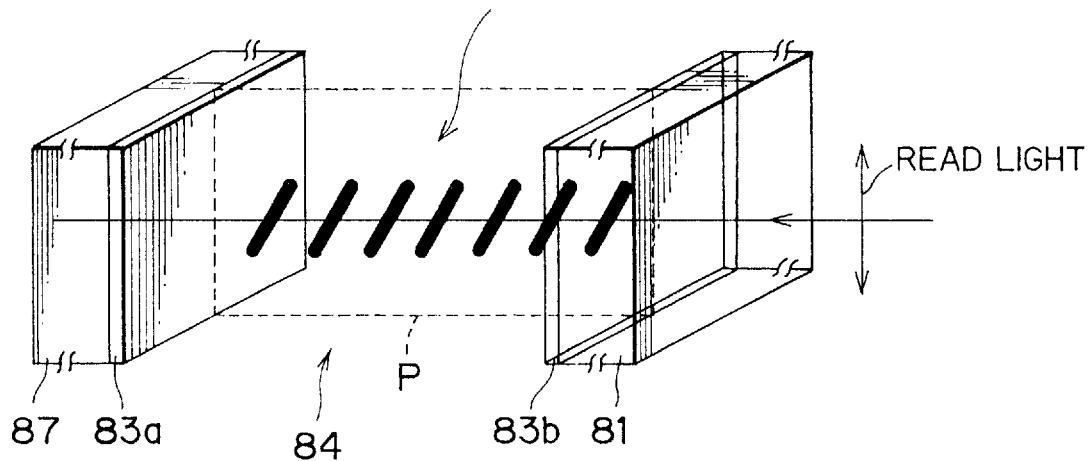

The liquid crystal layer 84 serves as the modulating part B. Coherent read light having a uniform distribution of intensity is projected onto the liquid crystal layer 84 through the glass plate 81 and the electrode film 82b. According to the present embodiment, in the liquid crystal layer 84, liquid crystal molecules of nematic phase are arranged to extend in parallel with the surfaces of the plates 87 and 81 as shown in FIG. 7(a). The molecules are arranged to stack directly on top of one another, i.e., with no spiral structure. Such a liquid crystal molecule arrangement is called a "homogeneous" arrangement. (It is noted that aligning rubbing directions of the alignment layers 83a and 83b in parallel with each other ensures that the nematic liquid crystal molecules line up in the homogeneous arrangement.) More specifically, the molecules are arranged along an imaginary plane P extending perpendicular to the surfaces of the plates 87 and 81. With no applied electric field, the molecules extend in the same direction parallel to the surfaces of the plates 87 and 81 along the plane P. When an electric field is occurred through the liquid crystal layer, due to dielectric anisotropy of the nematic liquid crystal, the arrangement of the liquid crystal molecules changes. In other words, the molecules tilt or rotate along the plane P, as shown in FIG. 7(b). Since the birefringence which the liquid crystal molecules present is determined dependently on the arrangement of the liquid crystal molecules, the birefringence changes. A linearly-polarized coherent read-light having a polarization plane aligned with the plane P is projected to the liquid crystal layer 84. The changed birefringence affects the phase of the read-light so as to modulate the read-light in phase. Thus, this SLM uses electrically-controlled birefringence effect (ECB effect) for modulating or diffracting the read-light.

The transparent electrode films 82a and 82b are preferably formed of indium-tin-oxide (ITO) . The dielectric mirror 85 is, for example, a multilayered dielectric mirror in which $SiO_2$ and $TiO_2$ layers are alternately stacked on each other.

A power supply 88 applies an ac electric voltage between the transparent electrode films 82a and 82b.

The SLM 80 having the above-described structure operates as described hereinafter.

The power supply 88 applies an ac electric voltage between the electrode film layers 82a and 82b. Since impedance is high at regions of the photoconductive layer 86 where no write-light is projected, a low voltage is applied across corresponding regions of the liquid crystal layer 84 due to the ratio of impedance of the liquid crystal layer 84 relative to impedance of the photoconductive layer 86. On the other hand, impedance of the photoconductive material lowers in regions where the write-light is projected, and the voltage across corresponding regions of the liquid crystal layer 84 increases. As a result, the arrangement of the liquid crystal molecules changes due to dielectric anisotropy of liquid crystal, which in turn alters birefringence of the liquid crystal. In other words, the birefringence of the liquid crystal is changed in accordance with intensity of the write-light incident on the photoconductive layer 86. Coherent read-light having a uniform intensity distribution is projected onto the glass plate 81 normally to the surface thereof. The coherent read-light is a linearly-polarized beam having its polarization plane parallel to the plane P along which the liquid crystal molecules are arranged. The read-light propagates in the liquid crystal layer 84 as modulated in phase by the varied birefringence of the liquid crystal, i.e., by the intensity of the write-light incident on the photoconductive layer 86. The read-light then reflects off the mirror layer 85 and again propagates in the liquid crystal layer 84 where the read-light is further modulated in phase. The read-light thus modulated in the liquid crystal layer 84 then outputs through the glass plate 81 in the direction normal to the surface thereof.

The SLM 80b should also preferably be formed from the above-described SLM.

It is noted that when each of the SLMs 80a and 80b is formed from the above-described SLM, the LDs 70a and 70b should be so designed as to emit a linearly-polarized laser beam with its polarization plane aligned with the plane C along which the liquid crystal molecules are arranged.

Figure 9:
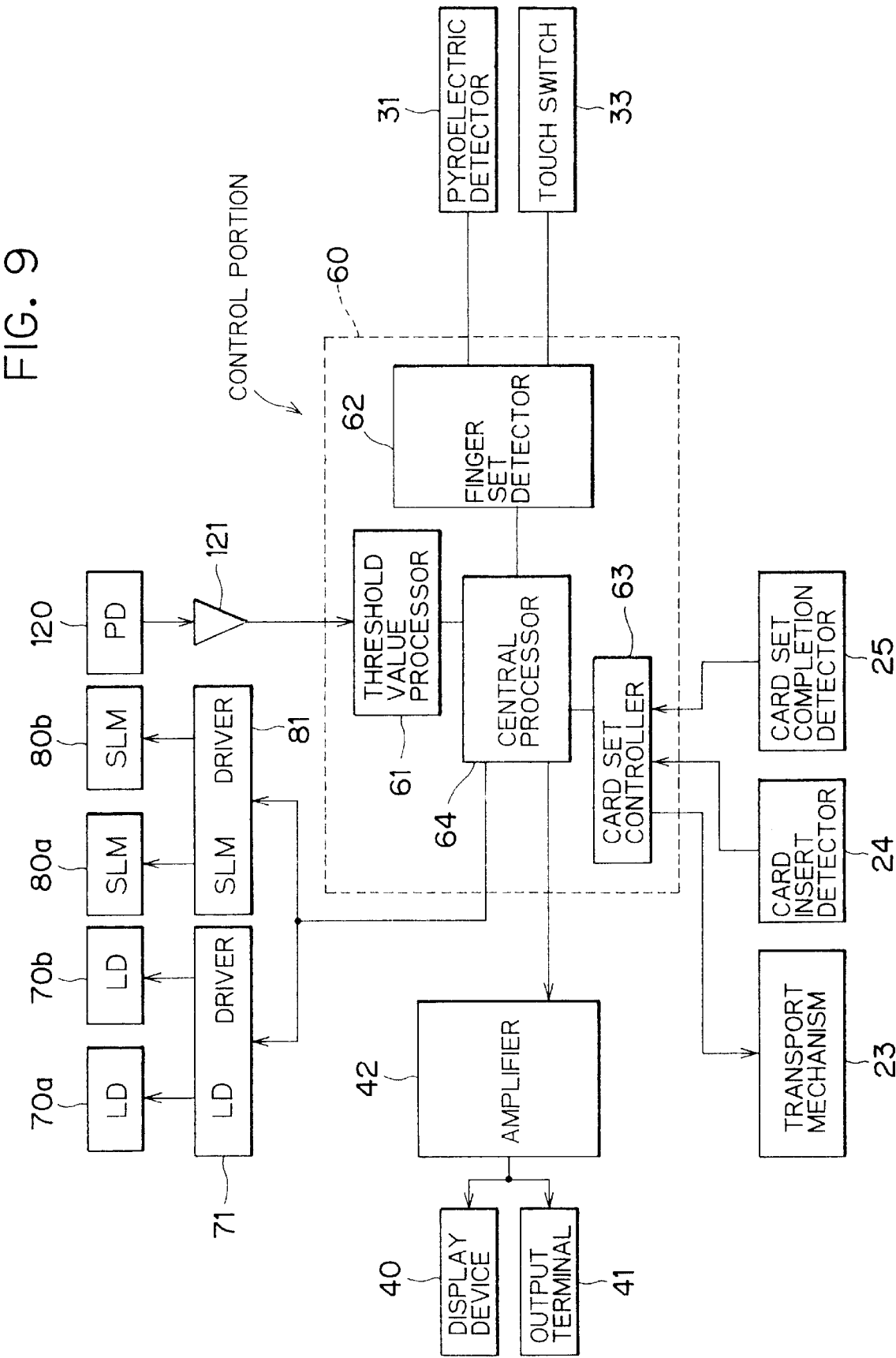
FIG. 9 is a block diagram of a control portion of the fingerprint identification apparatus according to the embodiment.

In the individual identification apparatus 100, as shown in FIGS. 3 and 9, the control portion 60 is provided for controlling an entire part of the fingerprint identifying apparatus. That is, the control portion 60 is provided for achieving control of power and signals in the entire part of the fingerprint identifying apparatus. The control portion 60 includes a central processor 64 and a threshold value processor 61, a finger set detector 62, and a card set controller 63 which are electrically connected to the central processor 64.

The finger set detector 62 is electrically connected to the pyroelectric detector 31 for receiving the signal outputted therefrom indicating that the living object or the finger 50 is placed on the prism 30a. The finger set detector 62 is further electrically connected to the touch switches 33a and 33b for receiving the signals outputted from the touch switches indicating that the finger is properly placed between the guide plates 32a and 32b. Receiving the signals from both the pyroelectric element 31 and the touch switch 33, the finger set detector 62 determines that the finger is properly positioned on the prism 30a.

The card set controller 63 is electrically connected to the transport mechanism 23 (more specifically, the drive motor 23c), the card insert detector 24, and the card set completion detector 25. Receiving the signal from the card insert detector 24 indicating that the card 10 is being inserted into the card insert/discharge slot 21, the card set controller 63 controls the transport mechanism 23 to start conveying the card 10 from the slot 21 toward the positioning stand 22. Receiving the signal from the card insert detector 24 indicating that the card 10 is being discharged from the card insert/discharge slot 21, the card set controller 63 controls the transport mechanism 23 to stop conveying the card 10 from the positioning stand 22 back toward the slot 21. Receiving the signal from the card set completion detector 25 indicating that the card 10 has been properly transported onto the positioning stand 22, the card set controller 63 controls the transport mechanism 23 to stop conveying the card from the slot 21 to the positioning stand 22.

The threshold value processor 61 is electrically connected to the photodetector 120 via an amplifier 121. The amplifier 121 receives the electrical correlation signal outputted from the photodetector 120 and amplifies the value of the correlation signal with a fixed amplification ratio and outputs the amplified signal. The threshold value processor 61 receives the amplified signal and compares the value of the amplified signal with a predetermined threshold level. The threshold value processor 61 outputs the compared result to the central processor 64. The compared result that the value of the amplified signal is higher than the threshold value indicates that the target image T (the arbitrary person's fingerprint) is the same as the reference image R (the specific person's fingerprint) and therefore that the arbitrary person is the same as the specific person. The compared result that the value of the amplified signal is not higher than the threshold value indicates that the target image T is different from the reference image R and therefore that the arbitrary person is different from the specific person.

The central processor 64 is further electrically connected to the display device 40 and the output terminal 41 via an output amplifier 42. The central processor 64 outputs the signal indicative of the compared result to the display device 40 and the output terminal 41 via the output amplifier 42. The signal thus supplied to the display device 40 serves as a command or control signal for the display device. That is, the signal indicating that the images T and R have high correlation, i.e., that the image T is the same as the image R will control the display device 40 to illuminate a green LED or display an "OK" sign on a liquid crystal display. The signal indicating that the images T and R have no correlation, i.e., that the image T is different from the image R will control the display device to illuminate a red LED or display a "NO GOOD" sign on a liquid crystal display.

The output terminal 41 is, for example, connected to a control equipment such as those that control to open and close doors for entering a room. Accordingly, the compared result indicating signal supplied to the output terminal 41 serves as a control signal for the control equipment. That is, the signal indicating that the images T and R have high correlation will control the control equipment to open the doors. The signal indicating that the images T and R have no correlation will control the control equipment to close the doors.

It should be noted that the output terminal 41 can be connected to various control equipments wherein confirmation of an individual's identity is required, not only, for entering information management rooms necessary for bank vaults and maintaining secrecy, but also for opening money drawers of automatic deposit devices, automatic withdrawal devices, etc.

The central processor 64 is further electrically connected to an LD driver 71. The LD driver 71 is provided for driving the first and second LDs 70a and 70b. The central processor 64 supplies the LD driver 71 with drive signals so as to allow the LD driver 71 to control the LDs 70a and 70b to emit laser beams. The central processor 64 is further electrically connected to an SLM driver 81. The SLM driver 81 is provided for driving the power supply 88 for each of the first and second SLMs 80a and 80b. The central processor 64 supplies the SLM driver 81 with drive signals so as to allow the SLM driver 81 to control the SLMs 80a and 80b to modulate the received read-light in accordance with the received write-light.

Figure 10:
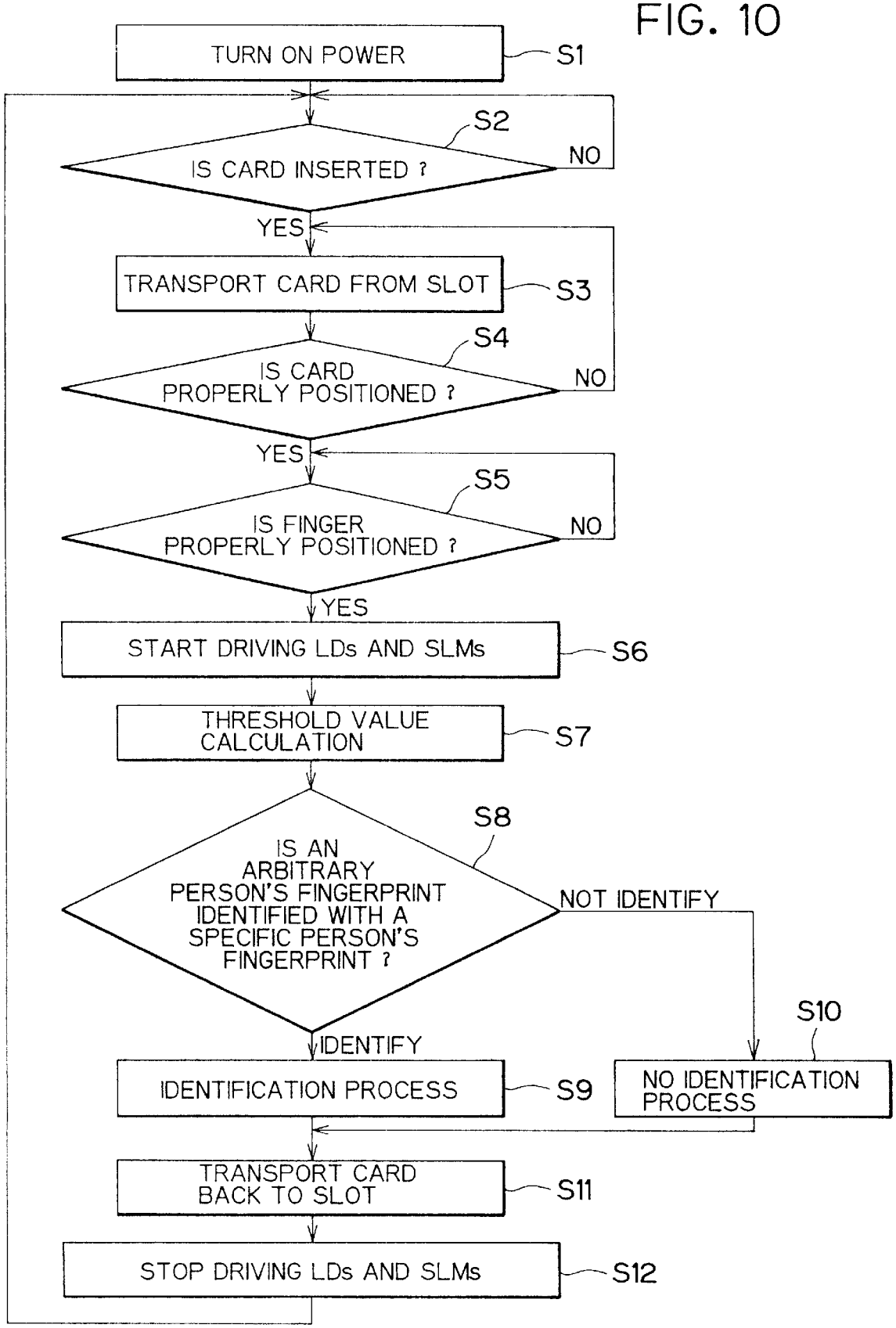
FIG. 10 is a flowchart of the operation of the fingerprint identification apparatus of the embodiment.

The fingerprint identification apparatus 100 having the above-described structure operates, as will be explained below with referring to FIG. 10.

First, an operator turns ON a main switch (not shown) provided on one side of the casing in step S1. Then, the operator inserts the card 10 into the card insert/discharge slot 21. When detecting the card thus inserted into the slot 21, the detector 24 outputs a signal indicative of that the card is inserted into the slot 21. When receiving the signal, the card set controller 63 determines that the card is properly inserted into the slot 21 in step S2. Then, in step S3, the controller 63 controls the motor 23c of the transport mechanism 23 to start rotating the rollers 23b to convey the card from the slot 21 to the positioning stand 22. When the card 10 reaches the positioning stand 22 and a leading edge of the card 10 contacts the detector 25, the detector 25 outputs a signal indicating that the card is properly positioned on the position detector 22. When receiving the signal, the card set controller 63 determines that the card is properly positioned on the positioning stand 22 in step S4. At this time, the card set controller 63 stops rotating the drive motor 23c.

Then, an arbitrary person under investigation places his/her finger 50 between the finger guide plates 32a and 32b provided to the prism 30a. When the finger is properly placed between the plates 32a and 32b, the touch switches 33a and 33b output signals indicating that the finger is properly placed between the guide plates 32a and 32b. Simultaneously, the pyroelectric detector 31 outputs a signal indicating that the placed finger 50 is a living object, i.e., the finger. Receiving these signals both from the touch switches 33a and 33b and the pyroelectric detector 31, the finger set detector 62 determines that the finger 50 is properly positioned on the prism 30a, in step S5. Then, in step S6, the finger set detector 62 instructs the central processor 64 to start supplying drive signals both to the LD driver 71 and the SLM driver 81. As a result, the first and second LDs 70a and 70b start emitting laser beams, and the first and second SLMs 80a and 80b start operating their modulating operations.

The laser light from the first LD 70a is split by the first half mirror 101a. A part of the laser light reflected at the half mirror 101a is again reflected at the incident angle adjusting mirror 102a to be introduced onto the hologram portion 11. The laser light is reflected or diffracted at the hologram portion 11 so as to bear thereon the specific person's fingerprint image. This image is then written on the first SLM 80a. A remaining part of the laser light that passes through the first half mirror 101a illuminates the finger 50 on the prism 30a. The laser light is reflected or diffracted by the fingerprint at the inner surface of the prism 30a so as to bear thereon the arbitrary person's fingerprint image. The fingerprint image is then written on the first SLM 80a. Accordingly, informations both from the finger 50 and from the card 10 are jointly written on the first SLM 80a.

The laser light from the second LD 70b is split into two directions by the half mirror 101b. A part of the laser light transmitted through the half mirror 101b is introduced into the first SLM 80a. Thus, the information written on the first SLM 80a is read as diffraction light. The diffraction light is Fourier transformed by the third lens 90c, and written on the second SLM 80b. A remaining part of the laser light reflected at the half mirror 101b is introduced into the second SLM 80b. Thus, the information written on the second SLM 80b is read as diffraction light.

After Fourier transformed by the fourth lens 90d, this diffraction light is imaged on the photodetector 120 as the output correlation peaks of the two images inputted to the SLM 80a. The photodetector 120 outputs an electric signal having a value indicative of the intensity of the correlation peak. The amplifier 121 receives and amplifies the value of the signal with the predetermined amplification ratio. The threshold value processor 61 receives the amplified signal and undergoes the threshold value calculations in step S7. That is, the processor 61 compares the value of the amplified signal with the predetermined threshold value, and outputs the compared result to the central processor 64. Receiving the compared result, the central processor 64 judges whether or not the two fingerprint images are recognized to be the same as each other, in step S8. More specifically, when the amplified signal value exceeds the threshold level, the central processor 64 determines that the fingerprint recorded on the hologram portion 11 and the arbitrary person's fingerprint 50 are recognized as a match in the step S8. Then, in step S9, the central processor 64 outputs a command to the display device 40 to illuminate a green LED or display an "OK" sign, for example. In addition, the central processor 64 outputs to the output terminal 41 an instruction that the arbitrary person is positively identified with the specific person. On the other hand, when the amplified signal value is equal to or lower than the threshold value, the central processor 64 confirms that the fingerprints are recognized as a mismatch in the step S8. Then, the central processor 64 performs a step S10 for outputting to the display device 40 a command, for example, to illuminate a red LED or display a "NO GOOD" sign. In addition, the central processor outputs to the output terminal 41 an instruction that the arbitrary person is negatively identified with the specific person.

Afterward, in step S11, the card set controller 63 controls the transport mechanism 23 to start conveying the card 10 back to the card insert/discharge slot 21. After when the card reaches the slot 21, the operator pulls out the card 10 from the card insert/discharge slot 21. At that time, the detector 24 outputs a signal indicating that the card is discharged out of the apparatus. Receiving the signal, the card set controller 63 stops driving the transport mechanism 23. Then, in step S12, the central processor 64 controls the LD driver 71 and the SLM driver 81 to stop driving the LDs 70a and 70b and the SLMs 80a and 80b. Then, one series of operations is completed.

As described above, the fingerprint identifying apparatus 100 of the present invention employs the optical system for achieving the Joint Transform Correlation process. Accordingly, operations from reading the fingerprint of the arbitrary person to be identified with the specific person and the fingerprint of the specific person recorded on the card to detecting the correlation peak are performed through optical parallel processings. Accordingly, correlation of the arbitrary person's fingerprint and the specific person's fingerprint can be measured quickly.

In addition, according to the JTC system, the intensity of the correlation signal does not depend on a positional relationship between the two fingerprint images incident in the first SLM. The positional relationship determines only the positional relationship between the zero order diffraction peak and the correlation peaks. Accordingly, the fingerprint identifying apparatus 100 does not necessitate positioning the two fingerprint images R and T with high accuracy and therefore is easily applicable to an actual use.

The JTC system of the present invention is employed with the optically-addressable SLMs. The optically-addressable SLMs can directly receive write-light and modulate read-light accordingly. Therefore, the entire structure of the JTC system becomes simple. In addition, the JTC processing can be achieved in much shorter period of time.

Thus, the fingerprint identifying apparatus 100 of the present invention can be realized in a simple structure with few components. Accordingly, the fingerprint identification apparatus can be broadly used not only for controlling comings and goings into and out of buildings and rooms, but also as an individual identification system for identification cards such as cash cards and credit cards.

In addition, according to the present invention, the fingerprint of the specific person is recorded on the card and not within the fingerprint identifying apparatus. There is no fear of invasion of privacy.

The fingerprint identifying apparatus includes a combination of the transport mechanism 23 for transporting the card to a predetermined position, the card set detector 25 for detecting that the card has been transported to the predetermined position, and the detectors 31 and 33 for detecting whether the arbitrary person's finger is properly placed on a predetermined position. Accordingly, only after when the card 10 is transported to the predetermined position and the arbitrary person's finger 50 is placed on the predetermined position, the threshold value processor 61 performs its threshold value calculations. Thus, unnecessary operations are avoided. That is, when the card is not inserted or when the finger is not in position, the threshold value calculations are not achieved.

While the invention has been described in detail with reference to a specific embodiment thereof, it would be apparent to those skilled in the art that various changes and modifications may be made therein without departing from the spirit of the invention.

For example, as shown in FIG. 11, the optically-addressable SLM 80a may be replaced with a combination of a CCD camera 130 and an electrically-addressable SLM 140 (for example, LCTV). The electrically-addressable SLM is different from the optically-addressable SLM in that an addressing part A' of the electrically-addressable SLM is so constructed as to receive electric signals representative of a desired image and to alter the optical characteristic of the modulating part B in accordance with the received electric signals. In FIG. 11, the CCD camera picks up the joint image of the reference image R (the specific person's fingerprint)

and the target image T (the arbitrary person's fingerprint) formed by the first and second lenses 90a and 90b. The CCD camera photoelectrically converts the thus picked up optical image into electrical signals. The CCD camera then outputs the electrical signals into the electrically-addressing part A' of the SLM 140. As a result, the optical characteristic of the modulating part B of the SLM varies dependently on the electrical signals. In other words, the joint image is written in the SLM 140. When laser light (read-light) is irradiated on the modulating part B, the laser light is modulated or diffracted in the modulating part and outputs therefrom. In other words, the joint image electrically written in the SLM 140 is optically read out. Successive operations are performed in the same manner as performed in the above-described embodiment.

In addition, as shown in FIG. 12, a combination of a CRT 150 and an optically-addressable SLM 160 can be used instead of the electrically-addressable SLM 140. In this case, the CCD cameral 130 first photoelectrically converts the optical image of the joint image into electrical image. The CRT receives and converts the electrical image back to an optical image. The CRT irradiates the optical image on the optically-addressing part A of the optically-addressable SLM 160. Accordingly, the joint image is written in the SLM 160. When the laser light (read-light) is irradiated on the modulating part B of the SLM, the written content is optically read out. In this case also, successive operations are performed in the same manner as performed in the above-described embodiment.

The second SLM 80b can also be replaced with the above-described combination of the CCD camera 130 and the electrically-addressable SLM 140 of FIG. 11 and the combination of the CCD camera 130, the CRT 150 and the optically-addressable SLM 160 of FIG. 12.

Figure 13:
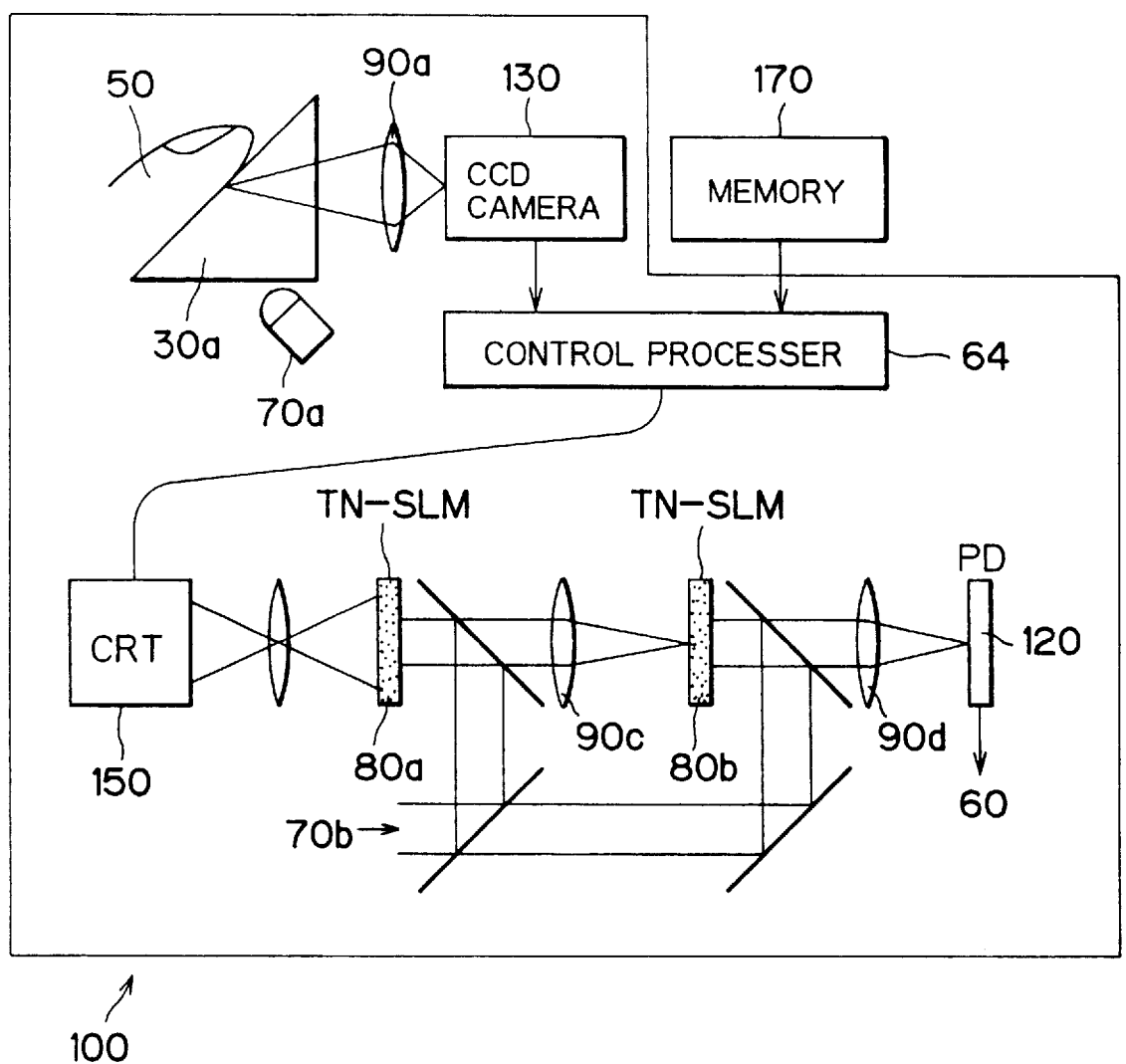
FIG. 13 shows a further modification of the fingerprint identification apparatus.

In the above-described embodiment, the reference image R (i.e., the specific person's fingerprint image) is recorded in the card 10. However, the reference image R may be stored in an external electrically storing device or memory 170 provided separately from the fingerprint identifying apparatus 100, as shown in FIG. 13. The memory 170 can be electrically connected to the central processor 64 for supplying the processor 64 with electric signals representative of the reference image R. Only the target image T (i.e., an arbitrary person's fingerprint) may be picked up by a CCD camera 130. The CCD camera 130 converts the optical fingerprint image into electrical signals. The CCD camera supplies the electrical signals into the central processor 64.

Thus receiving the informations on the reference image R and the target image T, the central processor 64 calculates or produces a joint image of them where the images R and T are placed side by side. A CRT (cathode-ray tube) 150 is electrically connected to the central processor 64. The central processor 64 supplies the CRT 150 with electric signals representative of the joint image. The CRT 150 therefore emits light bearing the joint image. The joint image is focused on the optically-addressing part of the 80a. In this case also, successive operations are performed in the same manner as performed in the above-described embodiment.

In the above-described embodiment, the optically-addressable SLMs 80a and 80b are of a type having the homogeneous arrangement type liquid crystal layer. However, the SLMs may be of a type provided with a liquid crystal layer of a deformation of aligned phase (DAP) type in which the nematic liquid crystal molecules are arranged in a homeotropic arrangement. Also, the SLMs may be of a type provided with a liquid crystal layer of a hybrid aligned nematic type in which the nematic liquid crystal molecules are arranged in a hybrid arrangement.

In addition, the optically-addressable SLMs 80a and 80b may be made from other types of optically-addressable SLM such as ferroelectric liquid crystal spatial light modulators (FLC-SLMs), twisted-nematic type liquid crystal spatial light modulators (TN-SLMs), etc.

We claim:

1. An individual identification apparatus for measuring correlation between a body portion of a specific individual and a body portion of an arbitrary individual to thereby determine whether the arbitrary individual is or is not the specific individual, the individual identification apparatus comprising:

first positioning means for positioning, at a predetermined first position, a portion of a body of an arbitrary individual to be identified with a specific individual;

first reading means for irradiating light onto the portion of the body of the arbitrary individual which is positioned at the first position to obtain a single optical image of the portion of the body of the arbitrary individual;

specific individual image producing means for producing a single optical image of a portion of a body of the specific individual based on information contained in an image of the portion of the body of the specific individual;

light producing means for producing coherent first and second read-lights, the second read-light being a linearly-polarized coherent beam having a polarization plane parallel to a first plane;

first spatial light modulating means for receiving an optical joint image made up of the single optical image of the portion of the body of the arbitrary individual and the single image of the portion of the body of the specific individual, the optical joint image having the single image of the portion of the body of the specific individual and the single image of the portion of the body of the arbitrary individual at different positions, said first spatial light modulating means receiving the first read-light and modulating the first read-light in accordance with the joint image to output the modulated first read-light:

a lens for Fourier transforming the modulated first read-light outputted from said first spatial light modulating means to thereby produce an optical Joint Fourier Transform image;

second spatial light modulating means for receiving the optical Joint Fourier Transform image and for receiving the second read-light and modulating the second read-light in accordance with the Joint Fourier Transform image to output a modulated second read-light, said second spatial light modulating means including a second optically-addressable spatial light modulator which has a single cell structure having a single optically-addressing part and a single modulating part, the optically-addressing part receiving the optical Joint Fourier Transform image and changing optical characteristic of the modulating part in accordance with the optical Joint Fourier Transform image, the modulating part receiving the second read-light and modulating the second read-light in accordance with the changed optical characteristic to output the modulated second read-light;

wherein the modulating part of said second optically-addressable spatial light modulator receives the second read-light and modulates phase of the second read-light in accordance with the changed optical characteristic, wherein the optically-addressing part of said second optically-addressable spatial light modulator includes a photosensing layer made of photoelectric material, said photosensing layer receiving the optical Joint Fourier Transform image and changing impedance of the photoelectric material dependently on the optical Joint Fourier Transform image, wherein the modulating part of said second optically-addressable spatial light modulator includes a liquid crystal layer formed of liquid crystal molecules of nematic phase and a pair of alignment layers provided to sandwich said liquid crystal layer therebetween for arranging the liquid crystal molecules in said liquid crystal layer in a homogenous arrangement so that the liquid crystal molecules are arranged to extend along a plane parallel to the first plane, wherein said second optically-addressable spatial light modulator further includes electric voltage applying means for applying an electric voltage through said photosensing layer and said liquid crystal layer to thereby produce an electric field in said liquid crystal layer, and wherein said photosensing layer changes the electric field produced in said liquid crystal layer in accordance with the changed impedance of the photoelectric material and causes the liquid crystal molecules to rotate along the plane parallel to the first plane due to dielectric anisotropy of the nematic liquid crystal molecules so as to electrically control the birefringence of the liquid crystal molecules to modulate the phase of the linearly-polarized second read-light in accordance with the electrically controlled birefringence, a lens for Fourier transforming the second read-light modulated by and outputted from said second spatial light modulating means to thereby produce an optical output correlation image;

intensity detecting means for detecting intensity of the optical output correlation image: and calculating means for comparing a value of the detected intensity with a predetermined threshold value so as to judge correlation of the image of the portion of the body of the specific individual and the image of the portion of the body of the arbitrary individual to thereby determine whether or not the arbitrary individual and the specific individual are the same individual.

2. An individual identification apparatus as claimed in claim 1, wherein said first spatial light modulating means includes a first optically-addressable spatial light modulator which has an optically-addressing part and a modulating part, the optically-addressing part receiving the optical joint image and changing an optical characteristic of the modulating part in accordance with the optical joint image, the modulating part receiving the first read-light and modulating the first read-light in accordance with the changed optical characteristic.

3. An individual identification apparatus as claimed in claim 2, wherein each of said first and second optically-addressable spatial light modulators has a single cell structure having a single optically-addressing part and a single modulating part, the single optically-addressing part of each optically-addressable spatial light modulator receiving a corresponding optical image and changing optical characteristic of the corresponding modulating part in accordance with the corresponding optical image, the single modulating part of each optically-addressable spatial light modulator receiving a corresponding one of the first and second read-lights and modulating the corresponding read-light in accordance with the changed optical characteristic.

4. An individual identification apparatus as claimed in claim 2, wherein the modulating part of each of said first and second optically-addressable spatial light modulator receives a corresponding one of the first and second read-lights and modulates phase of the corresponding read-light in accordance with the corresponding changed optical characteristic.

5. An individual identification apparatus as claimed in claim 4, wherein the optically-addressing part of said first and second optically-addressable spatial light modulators includes a photosensing layer made of photoelectric material, said photosensing layer receiving a corresponding optical image and changing impedance of the photoelectric material dependently on the optical image, wherein the modulating part of each of said first and second optically-addressable spatial light modulators includes a liquid crystal layer formed of liquid crystal molecules of nematic phase and a pair of alignment layers provided to sandwich said liquid crystal layer therebetween for arranging the liquid crystal molecules in said liquid crystal layer in a homogeneous arrangement so that the liquid crystal molecules are arranged to extend along a plane parallel to a first plane, wherein each of said first and second optically-addressable spatial light modulators further includes electric voltage applying means for applying an electric voltage through the corresponding photosensing layer and the corresponding liquid crystal layer to thereby produce an electric field in the liquid crystal layer, wherein said light producing means includes linearly-polarized beam producing means for producing the first and second read-lights of linearly-polarized coherent beams each having a polarization plane parallel to the first plane, and wherein the photosensing layer of each of said first and second optically-addressable spatial light modulators changes the electric field produced in the corresponding liquid crystal layer in accordance with the changed impedance of the photoelectric material and causes the liquid crystal molecules to rotate along the plane parallel to the first plane due to dielectric anisotropy of the nematic liquid crystal molecules so as to electrically control the birefringence of the liquid crystal molecules to modulate the phase of the linearly-polarized corresponding read-light in accordance with the electrically controlled birefringence.

6. An individual identification apparatus as claimed in claim 1, wherein said first spatial light modulating means includes:

image pick-up means for picking up the optical joint image and for converting the optical joint image into an electrical joint image; and an electrically-addressable spatial light modulator which has an electrically-addressing part and a modulating part, the electrically-addressing part receiving the electrical joint image and changing an optical characteristic of the modulating part in accordance with the electrical joint image, the modulating part receiving the first read-light and modulating the first read-light in accordance with the changed optical characteristic to output the modulated first read-light.

7. An individual identification apparatus as claimed in claim 1, wherein information on the portion of the body of the specific individual is recorded in an external storing device provided separately from the individual identification apparatus, wherein said specific individual image producing means includes information readout means for reading out the information from the external storing device to obtain the single optical image of the portion of the body of the specific individual, said information readout means supplying the single optical image of the portion of the body of the specific individual to said first spatial light modulating means so as to allow said first spatial light modulating means to receive the optical joint image.

8. An individual identification apparatus as claimed in claim 7, wherein the external storing device includes a card provided separately from the individual identification apparatus, and wherein said information readout means includes:

second positioning means for positioning the card at a predetermined second position; and second reading means for irradiating light onto the card which is positioned at the second predetermined position and reading out the information from the card to obtain the single optical image of the portion of the body of the specific individual.

9. An individual identification apparatus as claimed in claim 8, further comprising:

first detecting means for detecting that the part of the body of the arbitrary individual is positioned on the first position;

transporting means for transporting the card to the second position;

second detecting means for detecting that the card is transported to the second position; and controlling means for controlling said calculating means to start comparing the value of the detected intensity with the predetermined threshold value after said first detecting means detects that the portion of the body of the arbitrary individual is placed at the first position and said second detecting means detects that the card is transported to the second position.

10. An individual identification apparatus as claimed in claim 1, wherein the modulating part of said second optically-addressable spatial light modulator receives the second read-light and modulates phase of the second read-light in accordance with the changed optical characteristic.

11. An individual identification apparatus as claimed in claim 1, wherein said light producing means includes:

a light source for emitting a coherent light beam; and a beam splitter for splitting the coherent light beam into the first and second read-lights.

12. An individual identification apparatus as claimed in claim 1, wherein said first positioning means includes: a prism formed with an outer surface having the predetermined first position; and a finger positioning member for locating a finger of the arbitrary individual at the first position on the surface of the prism, said first reading means irradiating light onto the finger of the arbitrary individual which is positioned at the first position on the prism to obtain a single optical image of a fingerprint of the arbitrary individual, wherein the specific individual image producing means produces a single optical image of a fingerprint of the specific individual based on information on an image of the fingerprint of the specific individual, the information being recorded in a card provided separately from the individual identification apparatus, and wherein said specific individual image producing means includes: second positioning means for positioning the card at a predetermined second position; and second reading means for irradiating light onto the card which is positioned at the second position and for reading out the information from the card to obtain the single optical image of the fingerprint of the specific individual.

13. An individual identification apparatus as claimed in claim 12, further comprising:

a touch switch provided to the finger positioning member at a position capable of contacting an object located at the first position on the outer surface of the prism to thereby determine that an object is located at the first position;

a pyroelectric detector provided to the outer surface of the prism for detecting whether the object located at the first position is a living object to thereby determine whether the object located at the first position is the finger of the arbitrary individual;

a transporting member for transporting the card to the predetermined second position;

a card set completion detector provided at a position contactable with the card located at the second position for detecting that the card is transported to the second position; and a controlling unit for controlling said calculating means to start comparing the value of the detected intensity with the predetermined threshold value after said touch switch determines that an object is located at the first position, said pyroelectric detector determines that the object located at the first position is the finger of the arbitrary individual, and said card set completing detector detects that the card is transported to the second position.

14. An individual identification apparatus as claimed in claim 1, wherein the first reading means irradiates light onto a finger of the body of the arbitrary individual to obtain the optical image of the fingerprint of the arbitrary individual, and wherein the specific individual image producing means produces the optical image of the fingerprint of the specific individual based on information contained in a fingerprint image of the specific individual.

15. A fingerprint identification apparatus for measuring correlation of an image of a fingerprint of a specific individual and an image of a fingerprint of an arbitrary individual to thereby determine whether or not the arbitrary individual is identified with the specific individual, the fingerprint identification apparatus comprising:

light producing means for producing coherent first and second read-lights, the second read-light being a linearly-polarized coherent beam having a polarization plane parallel to a first plane;

first spatial light modulating means for receiving information contained in a joint image having a single image of a fingerprint of a specific individual and a single image of a fingerprint of an arbitrary individual to be identified with the specific individual and for receiving the first read-light to spatially modulate the first read-light in accordance with the joint image;

a first Fourier transform lens for receiving the first read-light modulated by and outputted from said first spatial light modulating means and spatially Fourier transforming the first read-light to thereby allow the first read-light to form a Joint Fourier Transform image for the image of the fingerprint of the specific individual and the image of the fingerprint of the arbitrary individual;

second spatial light modulating means for receiving the Joint Fourier Transform image and for receiving the second read-light to spatially modulate the second read-light in accordance with the Joint Fourier Transform image;

a second Fourier transform lens for receiving the second read-light modulated by and outputted from said second spatial light modulating means and spatially Fourier transforming the second read-light to thereby allow the second read-light to form a pair of correlation peaks representative of correlation of the image of the fingerprint of the specific individual and the image of the fingerprint of the arbitrary individual;

correlation detecting means for detecting intensity of one of the pair of correlation peaks; and calculating means for comparing a value of the detected intensity with a predetermined threshold value so as to judge correlation of the image of the fingerprint of the specific individual and the image of the fingerprint of the arbitrary individual to thereby determine whether or not the arbitrary individual is identified with the specific individual, wherein said second spatial light modulating means includes an optically-addressable SLM which has a single cell structure having a single optically-addressing part for receiving an optical image and a single modulation part having an optical characteristic, the optically-addressing part changing the optical characteristic of the modulation part dependently on the received optical image, the modulation part receiving and modulating the second read-light in accordance with the changed optical characteristic, wherein the optically-addressing part of said optically-addressable spatial light modulator includes a photosensing layer made of photoelectric material, said photosensing layer receiving the optical Joint Fourier Transform image and changing impedance of the photoelectric material dependently on the optical Join Fourier Transform image, wherein the modulating part of said optically-addressable spatial light modulator includes a liquid crystal layer formed of liquid crystal molecules of nematic phase and a pair of alignment layers provided to sandwich said liquid crystal layer therebetween for arranging the liquid crystal molecules in said liquid crystal layer in a homogeneous arrangement so that the liquid crystal molecules are arranged to extend along a plane parallel to the first plane, wherein said optically-addressable spatial light modulator further includes electric voltage applying means for applying an electric voltage through said photosensing layer and said liquid crystal layer to thereby produce an electric field in said liquid crystal layer, and wherein said photosensing layer changes the electric field produced in said liquid crystal layer in accordance with the changed impedance of the photoelectric material and causes the liquid crystal molecules to rotate along the plane parallel to the first plane due to dielectric anisotropy of the nematic liquid crystal molecules so as to electrically control the birefringence of the liquid crystal molecules to modulate the phase of the linearly-polarized second read-light in accordance with the electrically controlled birefringence.

16. A fingerprint identification apparatus as claimed in claim 15, further comprising first reading means for irradiating light onto a finger of the arbitrary individual to obtain a single optical image of the fingerprint of the arbitrary individual and for supplying the single optical image to said first spatial light modulating means.

17. A fingerprint identification apparatus as claimed in claim 15, wherein information on the image of the fingerprint of the specific individual is stored in an external storing device separately provided from the fingerprint identification apparatus, further comprising second reading means for reading out the single optical image of the fingerprint of the specific individual from the external storing device and for supplying the single optical image to said first spatial light modulating means.

18. A fingerprint identification apparatus as claimed in claim 15, wherein each of said first and second spatial light modulating means includes an optically-addressable SLM which has an optically-addressing part for receiving an optical image and a modulation part having an optical characteristic, the optically-addressing part changing the optical characteristic of the modulation part dependently on the received optical image, the modulation part receiving a corresponding one of the first and second read-lights and modulating the read-lights in accordance with the corresponding changed optical characteristic.

19. A fingerprint identification apparatus as claimed in claim 18, wherein the optically-addressable SLM of each of said first and second spatial light modulating means has a single cell structure having a single optically-addressing part and a single modulating part, the single optically-addressing part receiving the corresponding optical image and changing optical characteristic of the corresponding modulating part in accordance with the optical image, the modulating part receiving the corresponding read-light and modulating the read-light in accordance with the changed optical characteristic.

20. A fingerprint identification apparatus as claimed in claim 18, wherein the modulating part of the optically-addressable SLM of each of said first and second spatial light modulating means receives the corresponding read-light and modulates phase of the read-light in accordance with corresponding the changed optical characteristic.

21. A fingerprint identification apparatus as claimed in claim 20;

wherein the optically-addressing part of each of said first and second optically-addressable SLMs includes a photo-sensing layer made of photo-electric material, said photo-sensing layer receiving a corresponding optical image and changing impedance of the photoelectric material dependently on the optical image, wherein the modulating part of each of said first and second optically-addressable SLMs includes a liquid crystal layer formed of liquid crystal molecules of nematic phase and a pair of alignment layers provided to sandwich said liquid crystal layer therebetween for arranging the liquid crystal molecules in said liquid crystal layer in a homogeneous arrangement so that the liquid crystal molecules are arranged to extend along a plane parallel to the first plane, wherein each of said first and second optically-addressable SLMs further includes electric voltage applying means for applying an electric voltage through the corresponding photo-sensing layer and the corresponding liquid crystal layer to thereby produce an electric field in the liquid crystal layer, wherein said light producing means includes linearly-polarized beam producing means for producing the first and second read-lights of linearly-polarized coherent beams and each having a polarization plane parallel to the first plane, and wherein the photo-sensing layer of each of said first and second optically-addressable SLMs changes the electric field produced in the corresponding liquid crystal layer in accordance with the changed impedance of the photo-electric material and causes the liquid crystal molecules to rotate along the plane parallel to the first plane due to dielectric anisotropy of the nematic liquid crystal molecules so as to electrically control the birefringence of the liquid crystal molecules to modulate the phase of the linearly-polarized corresponding read-light in accordance with the electrically controlled birefringence.

* * * * *